US 11,412,484 B2

United States Patent
Vargas et al.

(10) Patent No.: US 11,412,484 B2
(45) Date of Patent: Aug. 9, 2022

(54) SIDELINK COMMUNICATION ACROSS FREQUENCY BANDS

(71) Applicant: QUALCOMM Incorporated, San Diego, CA (US)

(72) Inventors: Jose Edson Vargas, San Diego, CA (US); Junyi Li, Chester, NJ (US); Kapil Gulati, Hillsborough, NJ (US); Zhibin Wu, Los Altos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 27 days.

(21) Appl. No.: 16/880,719

(22) Filed: May 21, 2020

(65) Prior Publication Data

US 2020/0374858 A1 Nov. 26, 2020

Related U.S. Application Data

(60) Provisional application No. 62/852,817, filed on May 24, 2019.

(51) Int. Cl.
*H04W 72/04* (2009.01)
*H04W 76/15* (2018.01)
(Continued)

(52) U.S. Cl.
CPC ....... *H04W 72/0406* (2013.01); *H04W 16/28* (2013.01); *H04W 56/001* (2013.01); *H04W 72/0453* (2013.01); *H04W 76/15* (2018.02)

(58) Field of Classification Search
None
See application file for complete search history.

(56) References Cited

U.S. PATENT DOCUMENTS

2018/0234888 A1* 8/2018 Yasukawa ............... H04W 4/40
2019/0327732 A1* 10/2019 Yoon ................... H04W 72/042
(Continued)

OTHER PUBLICATIONS

Ericsson: "Distributed Synchronization Procedure for V2X Over PC5",3GPP Draft, R1-165317, SYNC Protocol, 3rd Generation Partnership Project (3GPP), Mobile Competence Centre, 650, Route Des Lucioles, F-06921 Sophia-Antipolis Cedex, France, vol. RAN WG1, No. Nanjing, May 23, 2016-May 27, 2016, May 14, 2016 (May 14, 2016), XP051089786, 6 pages, Retrieved from the Internet URL: http://www.3gpp.org/ftp/tsg_ran/WG1_RL1/TSGR1_85/Docs/. [retrieved on May 14, 2016] paragraph [0007].

(Continued)

*Primary Examiner* — Saba Tsegaye
(74) *Attorney, Agent, or Firm* — Loza & Loza, LLP

(57) ABSTRACT

Aspects of the disclosure relate to mechanisms for sidelink communication across frequency bands. In some examples, a wireless communication device may be configured to communicate over a first frequency band (e.g., a "sub-6 GHz band") and a second frequency band (e.g., a "millimeter wave band") with one or more other wireless communication devices. The wireless communication device may further be configured to perform cross-link scheduling of a transmission in which sidelink control information (SCI) is transmitted within a physical sidelink control channel (PSCCH) on the first frequency band and data corresponding to the SCI is transmitted within a physical sidelink shared channel (PSSCH) on the second frequency band.

29 Claims, 18 Drawing Sheets

(51) Int. Cl.
*H04W 56/00* (2009.01)
*H04W 16/28* (2009.01)

(56) References Cited

U.S. PATENT DOCUMENTS

| | | | | |
|---|---|---|---|---|
| 2019/0364492 | A1* | 11/2019 | Azizi | H04W 48/16 |
| 2020/0092685 | A1* | 3/2020 | Fehrenbach | H04B 7/2606 |
| 2020/0178256 | A1* | 6/2020 | Tang | H04W 76/14 |
| 2020/0313825 | A1* | 10/2020 | Ryu | H04L 5/0055 |
| 2020/0323019 | A1 | 10/2020 | Vargas et al. | |
| 2020/0351033 | A1* | 11/2020 | Ryu | H04L 1/1861 |
| 2020/0413295 | A1 | 12/2020 | Li et al. | |
| 2021/0013997 | A1* | 1/2021 | Liu | H04W 72/042 |
| 2021/0185674 | A1* | 6/2021 | Zhao | H04W 8/005 |
| 2021/0250931 | A1* | 8/2021 | Yang | H04L 5/0053 |

OTHER PUBLICATIONS

ETRI: "Sidelink Design for NR V2X", 3GPP Draft, R1-1809498, Sidelink Design for NR V2X (VF), 3rd Generation Partnership Project (3GPP), Mobile Competence Centre, 650, Route Des Lucioles, F-06921 Sophia-Antipolis Cedex, Fance, vol. RAN WG1, No. Gothenburg, Sweden, Aug. 20, 2018-Aug. 24, 2018, Aug. 17, 2018 (Aug. 17, 2018), XP051516861, 7 pages, Retrieved from the Internet URL: http://www.3gpp.org/ftp/tsg%5Fran/WG1%5FRL1/TSGR1% 5F94/Docs/R1%2D1809498%2Ezip. [retrieved on Aug. 17, 2018] paragraph [02.2].

International Search Report and Written Opinion—PCT/US2020/034283—ISA/EPO—dated Aug. 7, 2020.

NTT Docomo, et al., "Physical Layer structures and Procedure(s)", 3GPP Draft, R1-1809157, Physical Layer Structures and Procedure(s) Final, 3rd Generation Partnership Project (3GPP), Mobile Competence Centre, 650, Route Des Lucioles, F-06921 Sophia-Antipolis Cedex, France, vol. RAN WG1, No. Gothenburg, Sweden, Aug. 20, 2018-Aug. 24, 2018, Aug. 10, 2018 (Aug. 10, 2018), XP051516527, 10 pages, Retrieved from the Internet: URL: http://www.3gpp.org/ftp/tsg%5Fran/WG1%5FRL1/TSGR1%5F94/Docs/R1%2D1809157%2Ezip. [retrieved on Aug. 10, 2018] paragraph [0002].

Spreadtrum Communications: "Discussion on Sidelink Physical Layer structures and Procedure(s)", 3GPP Draft, R1-1811010, Discussion on Sidelink Physical Layer Structures and Procedure(s) Final, 3rd Generation Partnership Project (3GPP), Mobile Competence Centre, 650, Route Des Lucioles, F-06921 Sophia-Antipolis Cedex, France, vol. RAN WG1, No. Chengdu, China, Oct. 8, 2018-Oct. 12, 2018, Sep. 29, 2018 (Sep. 29, 2018), XP051518414, 7 pages, Retrieved from the Internet URL: http://www.3gpp.org/ftp/tsg%5Fran/WG1%5FRL1/TSGR1%5FRL1/TSGR1%5F94b/Docs/R1%2D1809157%2Ezip [retrieved on Aug. 10, 2018] paragraph [0002].

Toyota Infotechnology Center: "Discussion on Beam Management tor NR-V2X SidelinK in Millimeter—Wave Bands", 3GPP Draft, R1-1809039, Beam Management for NR-V2X Sidelink, 3rd Generation Partnership Project (3GPP), Mobile Competence Centre, 650, Route Des Lucioles, F-06921 Sophia-Antipolis Cedex, France, vol. RAN WG1, No. Gothenburg, Sweden, Aug. 20, 2018-Aug. 24, 2018, Aug. 11, 2018 (Aug. 11, 2018), XP051516411, 7 pages, Retrieved from the Internet: URL: http://www.3gpp.org/ftp/tsg%5Fran/WG1%5FRL1/TSGR1%5F94/Docs/R1%2D1809039%2Ezip [retrieved on Aug. 11, 2018] paragraph [0002].

\* cited by examiner

SIDELINK COMMUNICATION ACROSS FREQUENCY BANDS

PRIORITY CLAIM

This application claims priority to and the benefit of Provisional Patent Application No. 62/852,817, entitled "Sidelink Communication Across Frequency Bands," filed in the U.S. Patent and Trademark Office on May 24, 2019, the entire contents of which are incorporated herein by reference as if fully set forth below in their entirety and for all applicable purposes.

TECHNICAL FIELD

The technology discussed below relates generally to wireless communication networks, and more particularly, to sidelink wireless communication in different frequency bands.

INTRODUCTION

In many existing wireless communication systems, a cellular network is implemented by enabling wireless user equipment to communicate with one another through signaling with a nearby base station or cell. As a user equipment moves across the service area, handovers take place such that each user equipment maintains communication with one another via its respective cell.

Another scheme for a wireless communication system is a device-to-device (D2D) network, in which wireless communication devices may signal one another directly, rather than via an intermediary base station or cell. D2D communication networks may utilize direct signaling (e.g., sidelink signaling) to facilitate direct communication between wireless communication devices. In some D2D configurations, wireless communication devices may further communicate in a cellular system, generally under the control of a base station. Thus, the wireless communication devices may be configured for uplink and downlink signaling via a base station and further for sidelink signaling directly between the wireless communication devices without transmissions passing through the base station.

One example of a sidelink wireless communication system is a vehicle-to-everything (V2X) communication system. V2X communication involves the exchange of information not only between vehicles themselves, but also between vehicles and external systems, such as streetlights, buildings, pedestrians, and wireless communication networks. V2X systems enable vehicles to obtain information related to the weather, nearby accidents, road conditions, activities of nearby vehicles and pedestrians, objects nearby the vehicle, and other pertinent information that may be utilized to improve the vehicle driving experience, increase vehicle safety, and support autonomous vehicles.

As the demand for sidelink communication increases, research and development continue to advance communication technologies. For example, technologies for communication across different frequency bands may be useful, particularly for sidelink communication.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a method for wireless communication at a first wireless communication device is disclosed. The method includes establishing a first sidelink with a second wireless communication device on a first frequency band including a first carrier frequency, establishing, at least in part utilizing the first sidelink, a second sidelink with the second wireless communication device on a second frequency band including a second carrier frequency, and transmitting sidelink control information associated with data to be transmitted from the first wireless communication device to the second wireless communication device on the first sidelink. The method further includes transmitting the data to the second wireless communication device on the second sidelink.

Another example provides a first wireless communication device that includes a processor, a wireless transceiver communicatively coupled to the processor, and a memory communicatively coupled to the processor. The processor and the memory are configured to establish a first sidelink with a second wireless communication device on a first frequency band including a first carrier frequency via the wireless transceiver, establish, at least in part utilizing the first sidelink, a second sidelink with the second wireless communication device on a second frequency band including a second carrier frequency via the wireless transceiver, and transmit sidelink control information (SCI) associated with data to be transmitted from the first wireless communication device to the second wireless communication device via the wireless transceiver. The processor and the memory are further configured to transmit the data to the second wireless communication device on the second sidelink via the wireless transceiver.

Another example provides a method for wireless communication at a first wireless communication device. The method includes establishing a first sidelink with a second wireless communication device on a first frequency band including a first carrier frequency and receiving sidelink control information (SCI) associated with data to be transmitted by the second wireless communication device on the first sidelink. The SCI can include an indicator that the SCI is scheduling the data on resources within a second frequency band including a second carrier frequency.

Another example provides a first wireless communication device that includes a processor, a wireless transceiver communicatively coupled to the processor, and a memory communicatively coupled to the processor. The processor and the memory are configured to establish a first sidelink with a second wireless communication device on a first frequency band including a first carrier frequency via the wireless transceiver and receive sidelink control information (SCI) associated with data to be transmitted by the second wireless communication device on the first sidelink via the wireless transceiver. The SCI can include an indicator that the SCI is scheduling the data on resources within a second frequency band including a second carrier frequency.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
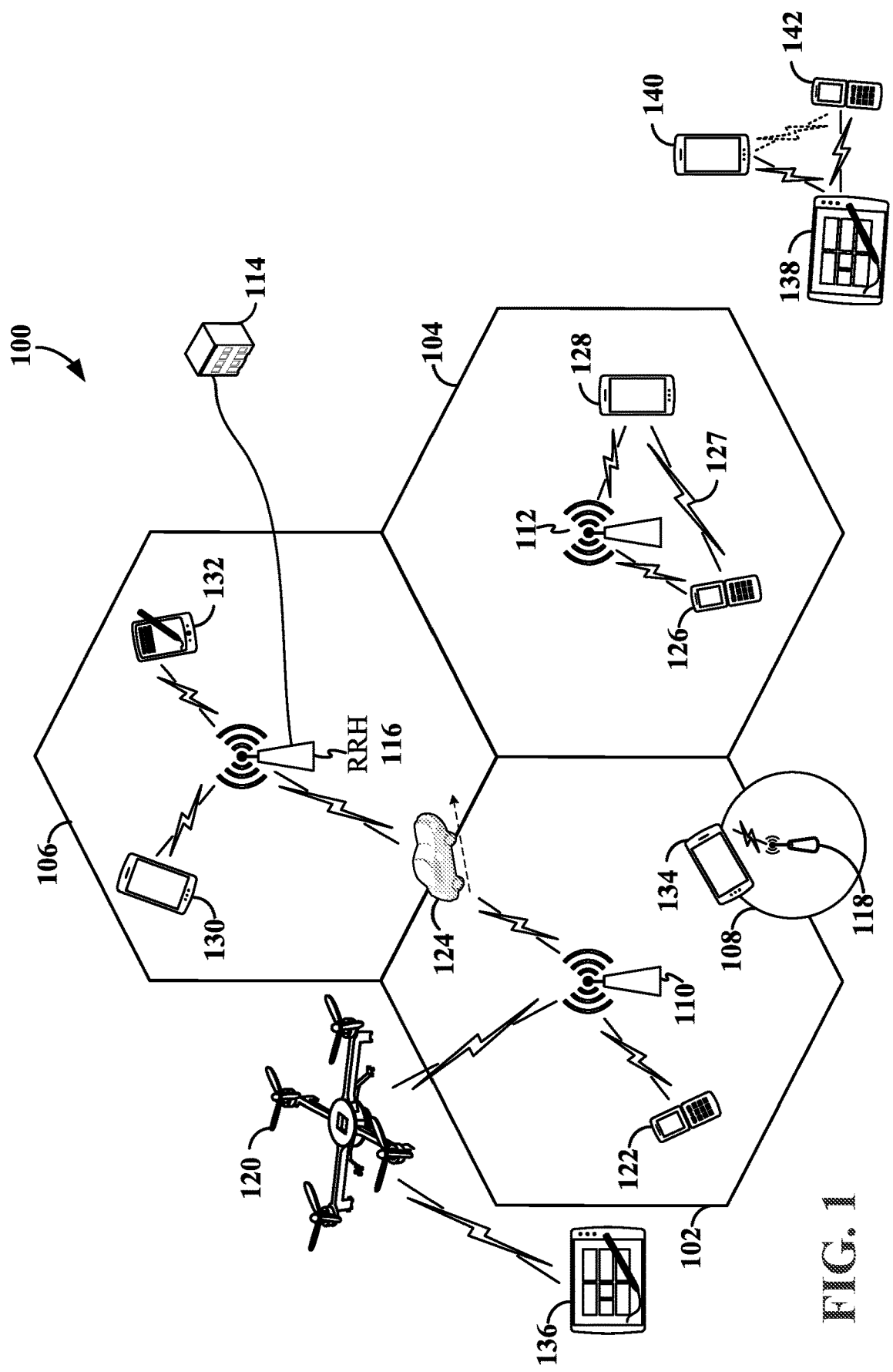
FIG. 1 is a diagram illustrating an example of a wireless radio access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

Various aspects of the disclosure relate to mechanisms for sidelink communication across frequency bands. In some examples, a wireless communication device may be configured to communicate over a first frequency band (e.g., a sub-6 GHz frequency band) and a second frequency band (e.g., a millimeter wave frequency band) with one or more other wireless communication devices. The wireless communication device may further be configured to perform cross-link scheduling of a transmission in which sidelink control information (SCI) is transmitted within a physical sidelink control channel (PSCCH) on the first frequency band and data corresponding to the SCI is transmitted within a physical sidelink shared channel (PSSCH) on the second frequency band.

In some examples, a first wireless communication device may establish a first sidelink with a second wireless communication device on the first frequency band and a second sidelink with the second wireless communication device on the second frequency band. The first wireless communication device may then transmit the PSCCH including the SCI on the first sidelink and the PSSCH on the second sidelink. The first wireless communication device may then receive a physical sidelink feedback channel (PSFCH) including feedback information corresponding to the data from the second wireless communication device on the first sidelink or the second sidelink. In some examples, two or more carrier frequencies (component carriers) within the second frequency band may be aggregated to form the second sidelink.

In some examples, link adaptation on the second sidelink may be facilitated using the first sidelink. For example, reference signal configuration information may be transmitted on the first sidelink. The reference signal configuration information may indicate a configuration of one or more references signals to be transmitted on the second sidelink. A channel state information (CSI) report indicative of the channel quality on the second sidelink may be generated based on the one or more reference signals. The CSI report may then be transmitted from the second wireless communication device to the first wireless communication device over the first sidelink or the second sidelink.

In some examples, the wireless communication devices may further synchronize timing on the first sidelink and the second sidelink. For example, the wireless communication devices may align respective slot boundaries on the first and second sidelinks or the first sidelink may schedule the PSCCH and PSSCH based on a timing offset between the first and second sidelinks.

In some examples, the SCI may further include resource information indicating resources allocated for the PSSCH. The resource information may be generated based on sidelink parameters (e.g., subcarrier spacing and bandwidth part) associated with either the first sidelink or the second sidelink. When the resource information is generated based on sidelink parameters associated with the first sidelink (e.g., a subcarrier spacing and bandwidth part utilized on the first sidelink), either the first wireless communication device or the second wireless communication device may translate the resource information into translated resource parameters associated with the second sidelink (e.g., a subcarrier spacing and bandwidth part utilized on the second sidelink).

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, or packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided. The RAN 100 may implement any suitable wireless communication technology or technologies to provide radio access. As one example, the RAN 100 may operate according to 3rd Generation Partnership Project (3GPP) New Radio (NR) specifications, often referred to as 5G. As another example, the RAN 100 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

The geographic region covered by the radio access network 100 may be divided into a number of cellular regions (cells) that can be uniquely identified by a user equipment (UE) based on an identification broadcasted over a geographical area from one access point or base station. FIG. 1 illustrates macrocells 102, 104, and 106, and a small cell 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB) or some other suitable terminology.

In FIG. 1, two base stations 110 and 112 are shown in cells 102 and 104; and a third base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the base stations 110, 112, and 114 support cells having a large size. Further, a base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the base station 118 supports a cell having a relatively small size. Cell sizing can be done according to system design as well as component constraints. It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In general, base stations may include a backhaul interface for communication with a backhaul portion (not shown) of the network. The backhaul may provide a link between a base station and a core network (not shown), and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The RAN 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quadcopter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the RAN 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with base station 118; and UE 136 may be in communication with mobile base station 120. Here, each base station 110, 112, 114, 118, and 120 may be configured to provide an access point to a core network (not shown) for all the UEs in the respective cells.

In another example, a mobile network node (e.g., quadcopter 120) may be configured to function as a UE. For example, the quadcopter 120 may operate within cell 102 by communicating with base station 110. In some aspects of the present disclosure, two or more UE (e.g., UEs 126 and 128) may communicate with each other using peer to peer (P2P) or sidelink signals 127 without relaying that communication through a base station (e.g., base station 112).

Wireless communication between a RAN 100 and a UE (e.g., UE 122 or 124) may be described as utilizing an air interface. Transmissions over the air interface from a base station (e.g., base station 110) to one or more UEs (e.g., UE 122 and 124) may be referred to as downlink (DL) transmission. In accordance with certain aspects of the present disclosure, the term downlink may refer to a point-to-multipoint transmission originating at a scheduling entity (described further below; e.g., base station 110). Another way to describe this scheme may be to use the term broadcast channel multiplexing. Transmissions from a UE (e.g., UE 122) to a base station (e.g., base station 110) may be referred to as uplink (UL) transmissions. In accordance with further aspects of the present disclosure, the term uplink may refer to a point-to-point transmission originating at a scheduled entity (described further below; e.g., UE 122).

For example, DL transmissions may include unicast or broadcast transmissions of control information and/or data (e.g., user data traffic or other type of traffic) from a base station (e.g., base station 110) to one or more UEs (e.g., UEs 122 and 124), while UL transmissions may include transmissions of control information and/or traffic information originating at a UE (e.g., UE 122). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

The air interface in the RAN 100 may utilize one or more multiplexing and multiple access algorithms to enable simultaneous communication of the various devices. For example, 5G NR specifications provide multiple access for UL or reverse link transmissions from UEs 122 and 124 to base station 110, and for multiplexing DL or forward link transmissions from the base station 110 to UEs 122 and 124 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the RAN 100 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

In the RAN 100, the ability for a UE to communicate while moving, independent of their location, is referred to as mobility. The various physical channels between the UE and the RAN are generally set up, maintained, and released under the control of an access and mobility management function (AMF), which may include a security context management function (SCMF) that manages the security context for both the control plane and the user plane functionality and a security anchor function (SEAF) that performs authentication. In various aspects of the disclosure, a RAN 100 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In a network configured for UL-based mobility, UL reference signals from each UE may be utilized by the network to select a serving cell for each UE. In some examples, the base stations 110, 112, and 114/116 may broadcast unified synchronization signals (e.g., unified Primary Synchronization Signals (PSSs), unified Secondary Synchronization Signals (SSSs) and unified Physical Broadcast Channels (PBCH)). The UEs 122, 124, 126, 128, 130, and 132 may receive the unified synchronization signals, derive the carrier frequency and radio frame timing from the synchronization signals, and in response to deriving timing, transmit an uplink pilot or reference signal. The uplink pilot signal transmitted by a UE (e.g., UE 124) may be concurrently received by two or more cells (e.g., base stations 110 and 114/116) within the RAN 100. Each of the cells may measure a strength of the pilot signal, and the RAN (e.g., one or more of the base stations 110 and 114/116 and/or a central node within the core network) may determine a serving cell for the UE 124. As the UE 124 moves through the RAN 100, the network may continue to monitor the uplink pilot signal transmitted by the UE 124. When the signal strength or quality of the pilot signal measured by a neighboring cell exceeds that of the signal strength or quality measured by the serving cell, the RAN 100 may handover the UE 124 from the serving cell to the neighboring cell, with or without informing the UE 124.

Although the synchronization signal transmitted by the base stations 110, 112, and 114/116 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the RAN 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In some examples, access to the air interface may be scheduled, wherein a scheduling entity (e.g., a base station) allocates resources (e.g., time-frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. In some examples, sidelink or other type of direct link signals may be communicated directly between UEs without necessarily relying on scheduling or control information from another network entity. That is, in some examples, a UE may function as a scheduling entity, scheduling resources for one or more scheduled entities (e.g., one or more other UEs). For example, UE 138 is illustrated communicating with UEs 140 and 142. In some examples, the UE 138 is functioning as a scheduling entity, while the UEs 140 and 142 may function as scheduled entities. In other examples, each of the UEs 138, 140, and 142 may function as both scheduling entities and scheduled entities. For example, UEs 138, 140, and 142 may communicate over a direct link in a device-to-device (D2D), peer-to-peer (P2P), vehicle-to-everything (V2X), and/or in a mesh network. In a mesh network example, UEs 140 and 142 may optionally communicate directly with one another in addition to communicating with a scheduling entity (e.g., UE 138).

In some examples, UE 138 may be a transmitting sidelink device that reserves resources on a sidelink carrier for the transmission of sidelink signals to UEs 140 and 142 in a D2D or V2X network. Here, UEs 140 and 142 are each receiving sidelink devices. UEs 140 and 142 may, in turn, reserve additional resources on the sidelink carrier for subsequent sidelink transmissions.

In other examples, UEs 138, 140, and 142 may be P2P devices (e.g., Bluetooth, Zigbee, or Near Field Communication (NFC) devices) communicating over a P2P carrier. For example, UEs 138, 140, and 142 may be Bluetooth devices that communicate over a short-wavelength (e.g., 2.45 GHz) carrier. Each Bluetooth device 138, 140, and 142 may operate at low power (e.g., 100 mW or less) to communicate over a short-range distance (e.g., 10 meters or less). In a Bluetooth network, the UEs 138, 140, and 142 may form an ad-hoc piconet and each pair of UEs (e.g., UEs 138 and 140; UEs 138 and 142; and UEs 140 and 142) may communicate over a different frequency in a frequency-hopping manner. Within the piconet, one of the UEs (e.g., UE 138) may function as the master, while the other UEs (e.g., UEs 140 and 142) function as slaves. Each of the UEs 138, 140, and 142 may automatically detect and connect to one another.

In some examples, two or more UEs (e.g., UEs 126 and 128) within the coverage area of a serving base station 112 may communicate with both the base station 112 using cellular signals and with each other using direct link signals 127 (e.g., sidelink, Bluetooth, and/or other types of direct link signals) without relaying that communication through the base station 112. In an example of a V2X network within the coverage area of the base station 112, the base station 112 and/or one or both of the UEs 126 and 128 may function as scheduling entities to schedule sidelink communication between UEs 126 and 128.

Two primary technologies that may be used by V2X networks include dedicated short range communication (DSRC) based on IEEE 802.11p standards and cellular V2X based on LTE and/or 5G (New Radio) standards. Various aspects of the present disclosure may relate to New Radio (NR) cellular V2X networks, referred to herein as V2X networks, for simplicity. However, it should be understood that the concepts disclosed herein may not be limited to a particular V2X standard or may be directed to direct link (e.g., sidelink) networks other than V2X networks.

Figure 2:
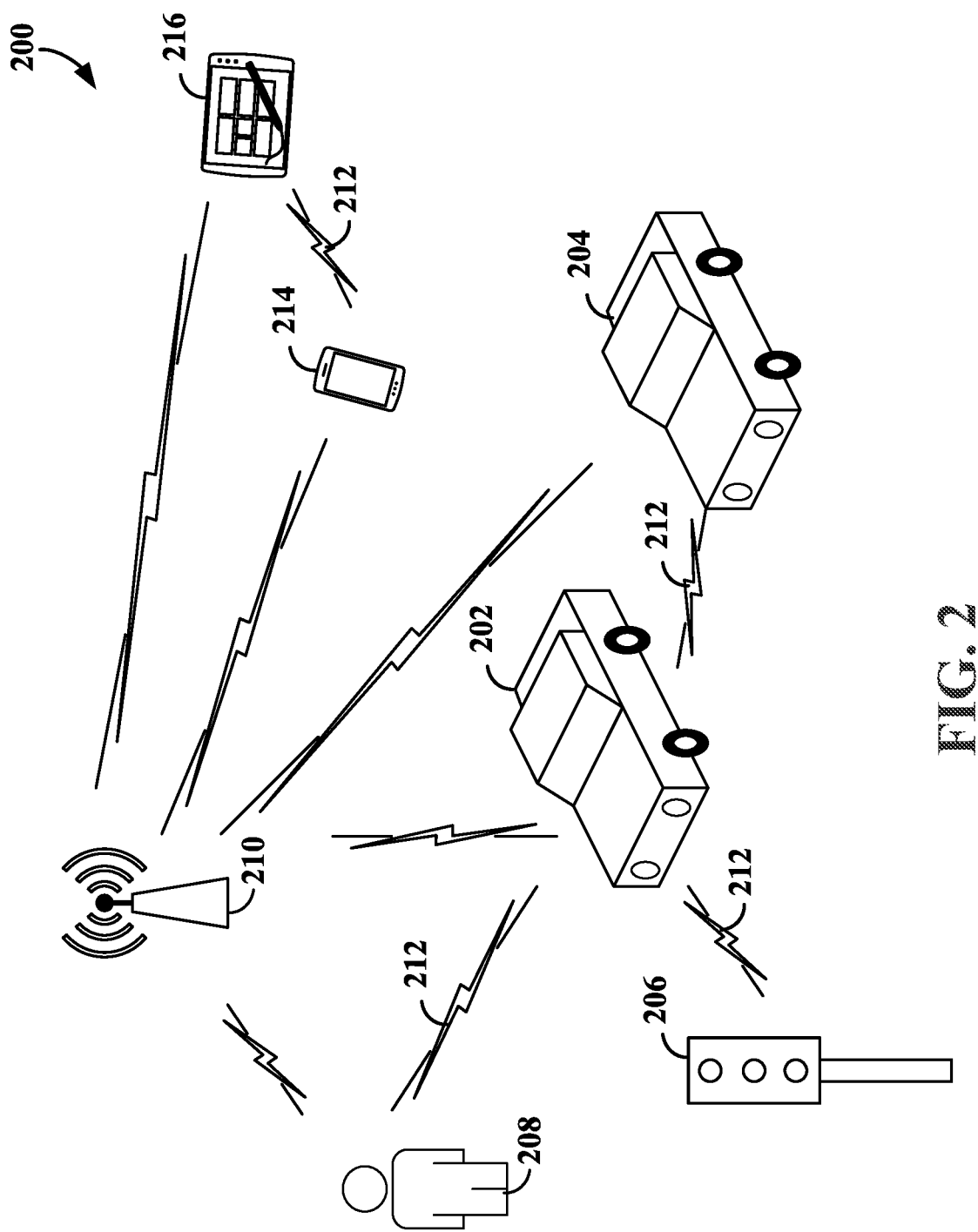
FIG. 2 is a diagram illustrating an example of a vehicle-to-everything (V2X) wireless communication network.

FIG. 2 illustrates an example of a wireless communication network 200 configured to support D2D (e.g., sidelink) communication. In some examples, sidelink communication may include V2X communication. V2X communication involves the wireless exchange of information directly between not only vehicles (e.g., vehicles 202 and 204) themselves, but also directly between vehicles 202/204 and infrastructure 206 (e.g., roadside units (RSUs)), such as streetlights, buildings, traffic cameras, tollbooths or other stationary objects, vehicles 202/204 and mobile devices 208 of pedestrians, and vehicles 202/204 and wireless communication networks (e.g., base station 210). In some examples, V2X communication may be implemented in accordance with the New Radio (NR) cellular V2X standard defined by 3GPP, Release 15, or other suitable standard.

A V2X transmission may include, for example, unicast transmissions, groupcast transmissions, and broadcast transmissions. Unicast describes a transmission, for example, from a vehicle (e.g., vehicle 202) to one other vehicle (e.g., vehicle 204). Groupcast arises when a group of UEs (e.g., vehicles 202 and 204) form a cluster. Data may be groupcasted within the cluster. Broadcast describes a transmission from, for example, a UE (e.g., vehicle 202) to surrounding receivers (e.g., vehicle 204, RSU 206, mobile devices 208 of pedestrians/cyclists, the network 210, or any combination thereof) in proximity to the transmitting UE.

V2X communication enable vehicles 202 and 204 to obtain information related to the weather, nearby accidents, road conditions, activities of nearby vehicles and pedestrians, objects nearby the vehicle, and other pertinent information that may be utilized to improve the vehicle driving experience and increase vehicle safety. For example, such V2X data may enable autonomous driving and improve road safety and traffic efficiency. For example, the exchanged V2X data may be utilized by a V2X connected vehicle 202 and 204 to provide in-vehicle collision warnings, road hazard warnings, approaching emergency vehicle warnings, pre-/post-crash warnings and information, emergency brake warnings, traffic jam ahead warnings, lane change warnings, intelligent navigation services, and other similar information. In addition, V2X data received by a V2X connected mobile device of a pedestrian/cyclist 208 may be utilized to trigger a warning sound, vibration, flashing light, etc., in case of imminent danger.

The sidelink communication between vehicles 202 and 204 or between a vehicle 202 or 204 and either infrastructure 206 or a pedestrian 208 occurs over a proximity service (ProSe) PC5 interface 212. In various aspects of the disclosure, the PC5 interface 212 or other direct interface may further be utilized to support D2D communication in other proximity use cases. Examples of other proximity use cases may include public safety or commercial (e.g., entertainment, education, office, medical, and/or interactive) based proximity services. As used herein, the term proximity service (ProSe) communication refers to the direct (e.g., D2D) communication between UEs in proximity use cases other than V2X. In the example shown in FIG. 2, direct (e.g., ProSe) communication may occur between UEs 214 and 216.

ProSe communication may support different operational scenarios, such as in-coverage, out-of-coverage, and partial coverage. Out-of-coverage refers to a scenario in which UEs 214 and 216 are outside of the coverage area of a base station (e.g., base station 210), but each are still configured for ProSe communication. Partial coverage refers to a scenario in which one of the UEs (e.g., UE 216) is outside of the coverage area of a base station (e.g., base station 210), while the other UE (e.g., UE 214) is in communication with the base station 210. In-coverage refers to a scenario in which UEs 214 and 216 are in communication with the base station 210 (e.g., gNB) via a Uu (e.g., cellular interface) connection to receive ProSe service authorization and provisioning information to support ProSe operations.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
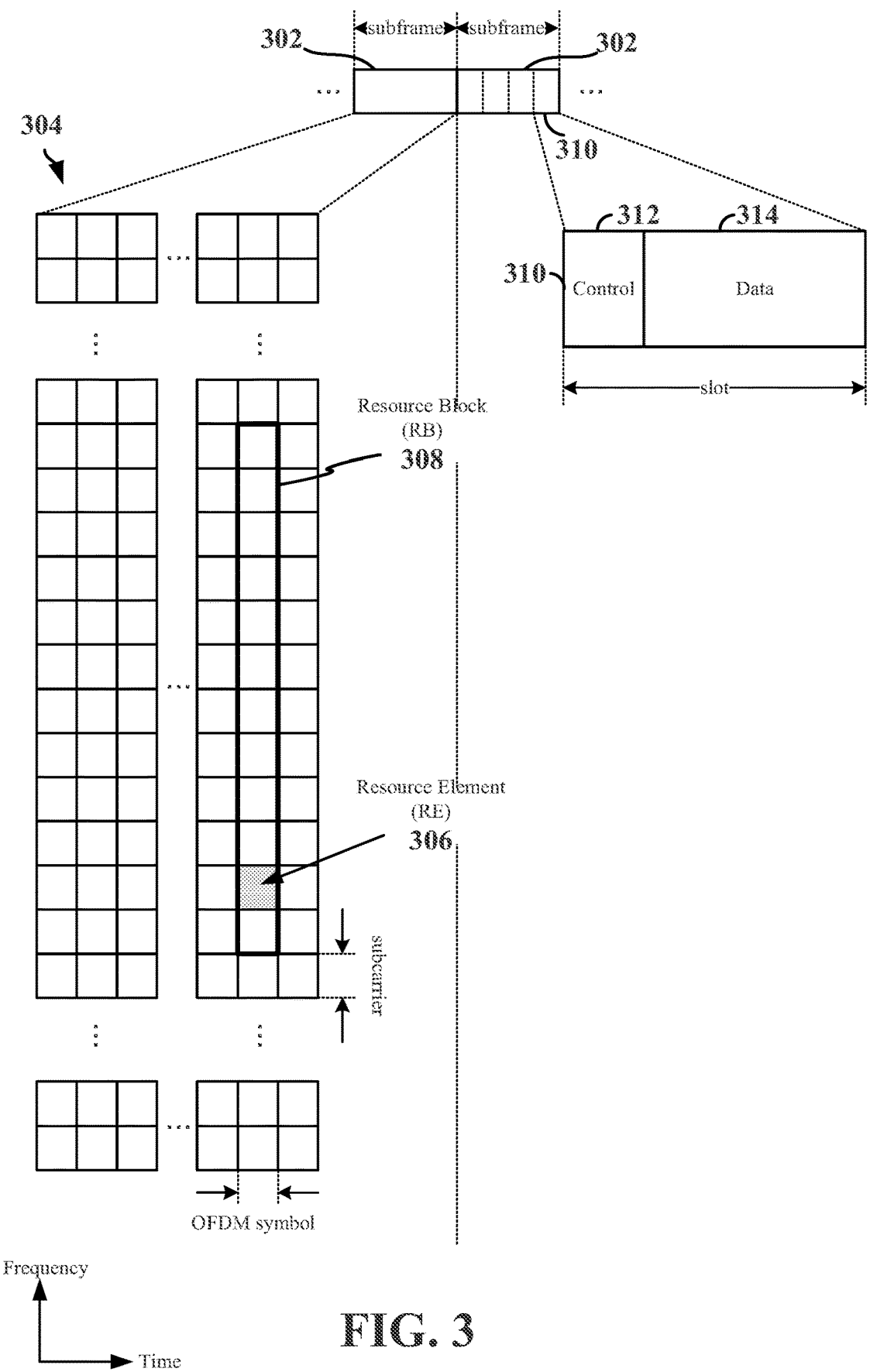
FIG. 3 is a schematic diagram illustrating organization of wireless resources in an air interface utilizing orthogonal frequency divisional multiplexing (OFDM).

Referring now to FIG. 3, an expanded view of an exemplary subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

Scheduling of wireless communication devices (e.g., UEs, V2X devices, D2D devices, or other suitable devices) for downlink, uplink, or sidelink transmissions typically involves scheduling one or more resource elements 306 within one or more sub-bands. Thus, a wireless communication device generally utilizes only a subset of the resource grid 304. In some examples, an RB may be the smallest unit of resources that can be allocated to a wireless communication device. Thus, the more RBs scheduled for a wireless communication device, and the higher the modulation scheme chosen for the air interface, the higher the data rate for the wireless communication device. The RBs may be scheduled by a base station (e.g., gNB, eNB, RSU, etc.) or may be self-scheduled by a wireless communication device implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one to three OFDM symbols). These mini-slots may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The simple structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 308.

In some examples, the slot 310 may be utilized for broadcast or unicast communication. For example, in V2X or D2D networks, a broadcast communication may refer to a point-to-multipoint transmission by a one device (e.g., a vehicle, base station (e.g., RSU, gNB, eNB, etc.), UE, or other similar device) to other devices. A unicast communication may refer to a point-to-point transmission by a one device to a single other device.

In an example of sidelink or D2D communication, the control region 312 of the slot 310 may include a physical sidelink control channel (PSCCH) including sidelink control information (SCI) transmitted by a wireless communication device (e.g., UE, V2X, D2D device or more generally, a sidelink device) towards a set of one or more other sidelink devices. In some examples, the SCI may include synchronization information to synchronize communication between sidelink devices on the sidelink channel. In addition, the SCI may include scheduling information indicating one or more resource blocks within the data region 314 reserved by an initiating (or transmitting) sidelink device (e.g., the "scheduling entity") for sidelink communication. The data region 314 of the slot 310 may include a physical sidelink shared channel (PSSCH) including the data transmitted by the transmitting sidelink device within the reserved resources over the sidelink channel.

For unicast sidelink connections, the PSSCH may further include a reference signal, such as a channel state information-reference signal (CSI-RS), for use by a receiving sidelink device in measuring the channel quality (e.g., Signal to Interference Plus Noise Ratio (SINR)). Channel quality measurements (e.g., SINRs) may be used (e.g., in real-time) to aid in providing a channel state information (CSI) report to the transmitting sidelink device for ever-changing channel conditions. For example, channel quality measurements can be used to calculate, determine, produce, or obtain a spectral efficiency (SPEF) of a channel. The SPEF of the measured channel may then be used to identify a channel quality indicator (CQI). For example, the receiving sidelink device may calculate the SPEF and then map the SPEF to a particular CQI.

The receiving sidelink device may then feedback the channel quality (e.g., the CQI) to the transmitting sidelink device within the CSI report. The CSI report may further include a rank indicator (RI), along with a precoding matrix indicator (PMI). The transmitting sidelink device may utilize the CSI report to update the rank associated with the receiving sidelink device and assign resources for future unicast sidelink transmissions to the receiving sidelink device. For example, the CQI indicates to the transmitting sidelink device an MCS to use for the future unicast transmissions to the receiving sidelink device. Although the above description is directed to unicast sidelink transmissions, it should be understood that CSI reporting may also be utilized in groupcast transmissions (e.g., transmissions to a group of sidelink devices).

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 3 are not necessarily all of the channels or carriers that may be utilized between devices, and those of ordinary skill in the art will recognize that other channels or carriers may be utilized in addition to those illustrated, such as other traffic, control, and feedback channels.

In some aspects of the disclosure, wireless communication devices, such as sidelink devices, may be configured for beamforming and/or multiple-input multiple-output (MIMO) technology. For example, in millimeter wave (mmWave) sidelink systems, beamformed signals may be utilized for most channels, including the physical sidelink control channel (PSCCH) and physical sidelink shared channel (PSSCH).

Figure 4:
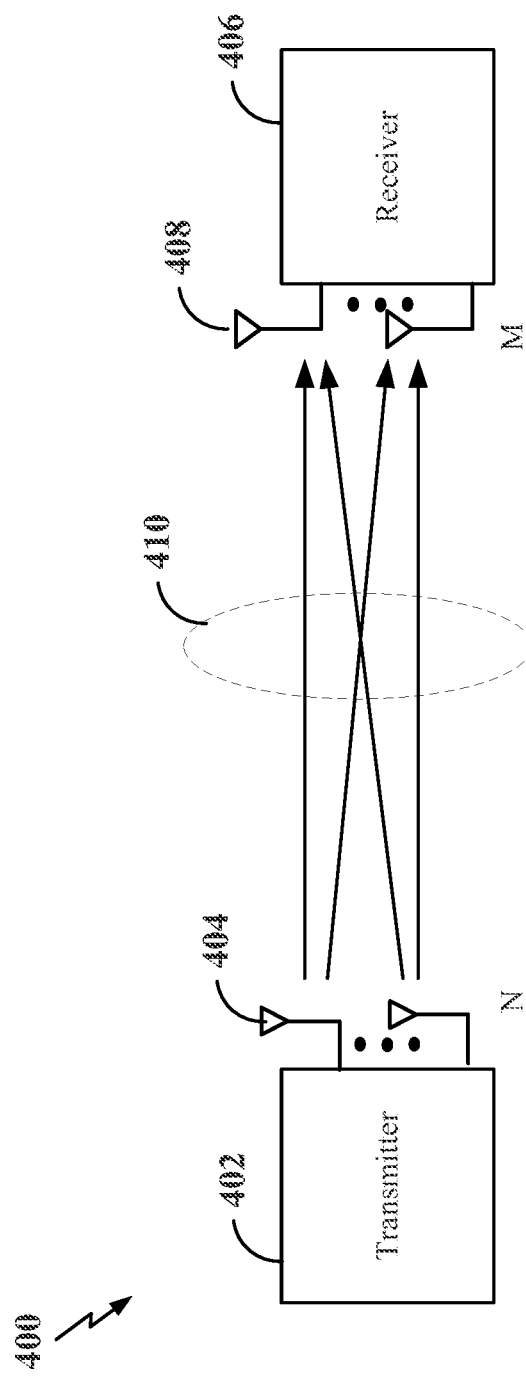
FIG. 4 is a block diagram illustrating a wireless communication system supporting beamforming and multiple-input multiple-output (MIMO) communication.

FIG. 4 illustrates an example of a wireless communication system 400 supporting beamforming and/or MIMO. In a MIMO system, a transmitter 402 includes multiple transmit antennas 404 (e.g., N transmit antennas) and a receiver 406 includes multiple receive antennas 408 (e.g., M receive antennas). Thus, there are N×M signal paths 410 from the transmit antennas 404 to the receive antennas 408. Each of the transmitter 402 and the receiver 406 may be implemented, for example, within a sidelink device or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single wireless communication device to increase the data rate or to multiple wireless communication devices to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the wireless communication device(s) with different spatial signatures, which enables each of the wireless communication device(s) to recover the one or more data streams destined for that wireless communication device.

Beamforming is a signal processing technique that may be used at the transmitter 402 or receiver 406 to shape or steer an antenna beam (e.g., a transmit beam or receive beam) along a spatial path between the transmitter 402 and the receiver 406. Beamforming may be achieved by combining the signals communicated via antennas 404 or 408 (e.g., antenna elements of an antenna array module) such that some of the signals experience constructive interference while others experience destructive interference. To create the desired constructive/destructive interference, the transmitter 402 or receiver 406 may apply amplitude and/or phase offsets to signals transmitted or received from each of the antennas 404 or 408 associated with the transmitter 402 or receiver 406.

V2X communication systems may utilize both millimeter wave (mmWave) frequency bands and sub-6 GHz frequency bands. As illustrated in FIG. 4, mmWave frequency band beamforming may be utilized to communicate over directional beams, and sub-6 GHz frequency band omni-directional or other like beams may be used for communication.

Figure 5:
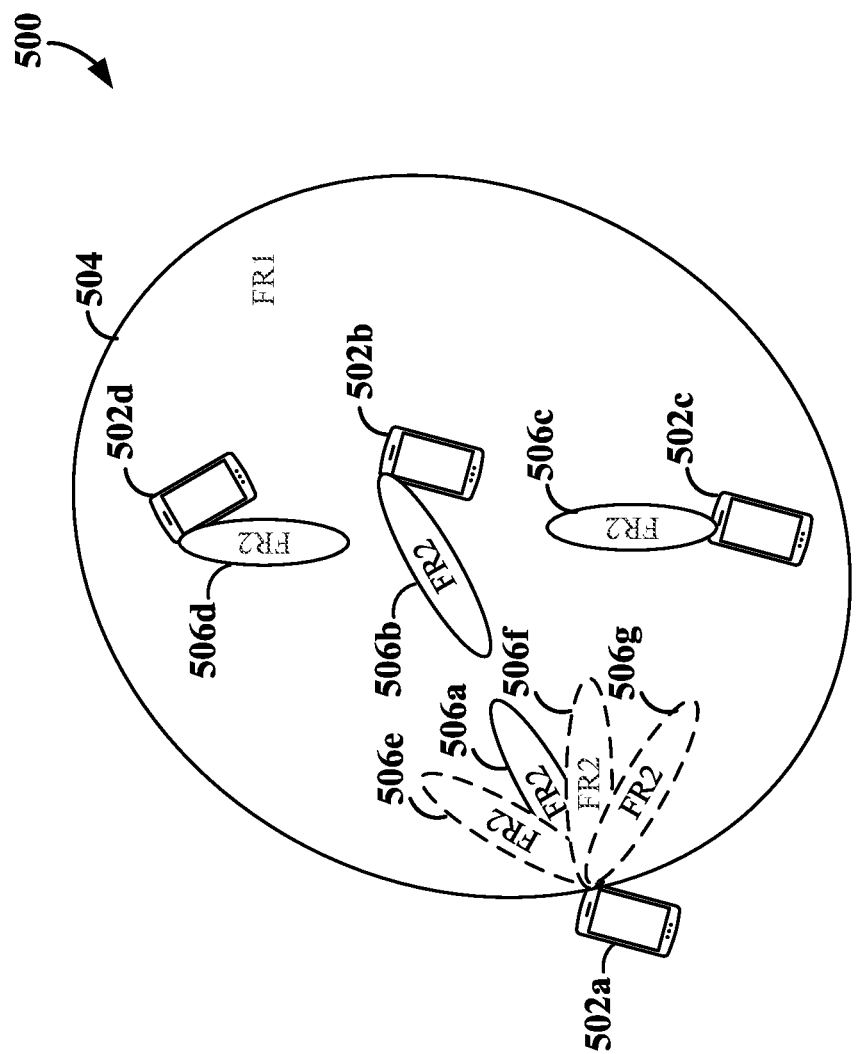
FIG. 5 is a diagram illustrating an example of sidelink communication across two different frequency bands in a wireless network.

FIG. 5 is a diagram illustrating an example of sidelink communication across two different frequency bands in a wireless network. The wireless network 500 includes a plurality of wireless communication devices (e.g., sidelink devices) 502a-502d, each of which may correspond, for example, to one of the V2X or D2D devices shown in FIG. 2.

In the example shown in FIG. 5, the sidelink device 502a may be configured to simultaneously operate in at least two frequency bands, such as, for example, one or more sub-6 GHz bands and one or more mmWave bands. As used herein, the term "simultaneously" may refer to the capability of the sidelink device to communicate over both a first frequency band FR1 and a second frequency band FR2 during overlapping time periods, though the sidelink device may not be transmitting and/or receiving data on both frequency bands at the same time.

In example sub-6 GHz communications, the sidelink device 502a may be configured to transmit an omni-directional beam 504 over FR1. The omni-directional beam 504 may be received by a plurality of other sidelink devices 502b, 502c, and 502d. In example mmWave communications, the sidelink device 502a may be configured to transmit a directional beam 506a over FR2. Due to the directional nature of beam 506a, the directional transmit beam 506a may be received by a subset of the plurality of sidelink devices. For example, the directional transmit beam 506a may be received by a single receiving sidelink device (e.g., sidelink device 502b). In this example, the receiving sidelink device 502b may utilize a directional receive beam 506b to receive communications from the transmitting sidelink device 502a. The transmit beam 506a and receive beam 506b collectively form a beam pair link (BPL) for the signal path over FR2 between the sidelink devices 502a and 502b.

In some examples, a unicast connection between the sidelink device 502a and another sidelink device (e.g., the sidelink device 502b) may be established over an FR1 sidelink and/or an FR2 sidelink. To establish a unicast connection over an FR1 sidelink (e.g., a sub-6 GHz sidelink), the sidelink device 502a may utilize, for example, a D2D (e.g., V2V, V2X, etc.) peer-to-peer discovery procedure to identify and locate candidate sidelink devices for unicast communications. For example, the sidelink device 502a may locate candidate sidelink devices using basic service messages (BSMs) broadcasted by neighboring sidelink devices (e.g., sidelink devices 502b, 502c, and 502d). The BSM may include location information (e.g., Global Positioning System (GPS) coordinates) of the broadcasting sidelink device, security and identity information, and vehicle information (e.g., speed, trajectory, route, etc.) of the broadcasting sidelink device. Upon locating another sidelink device (e.g., the sidelink device 502b), the sidelink devices 502a and 502b may establish a radio resource control (RRC) connection and a signaling radio bearer (SRB) on an FR1 sidelink via, for example, a D2D RRC interface (e.g., an RRC procedure over the PC5 interface).

The sidelink devices 502a and 502b may then set a packet data convergence protocol (PDCP) context, a radio link control (RLC) context, a medium access control (MAC) context, and a physical layer (PHY) context for the FR1 unicast connection. For example, the PDCP context may indicate whether PDCP duplication is utilized for the unicast connection. The RLC context may indicate whether an acknowledged mode (e.g., a reordering timer is used) or an unacknowledged mode is used for the RLC layer. The MAC context may enable, for example, a hybrid automatic repeat request (HARQ) feedback scheme, resource selection algorithms, carrier aggregation, or other MAC parameters for the unicast connection. The PHY context may indicate a transmission format and a radio resource configuration (e.g., bandwidth part (BWP), numerology, etc.) for the unicast connection.

A unicast connection between the sidelink device 502a and another sidelink device (e.g., the sidelink device 502b) over an FR2 sidelink (e.g., a mmWave sidelink) may be established in a standalone (SA) mode or in a non-standalone (NSA) mode. In the SA mode, the mmWave sidelink may be established without the support of any other previously established communication link in a different frequency band or radio access technology (RAT).

In the NSA mode, the mmWave sidelink is established with the support of a previously established unicast link (e.g., the sub-6 GHz sidelink). For example, the sidelink device 502a may transmit an RRC reconfiguration message (e.g., an RRCDirectConnectionReconfiguraton message) to the sidelink device 502b over the SRB previously established via the FR1 sidelink. The RRC reconfiguration message may include, for example, mmWave physical layer (PHY) configurations for beam direction(s), timing, location, and/or other Layer 1 (L1)/Layer 2 (L2) parameters in the radio protocol stack (e.g., the Open System Interconnection (OSI) model). The sidelink devices 502a and 502b may then perform PHY and MAC Layer procedures in FR2 to determine the serving BPL (e.g., beams 506a and 506b) and perform synchronization.

Upon establishing the mmWave (FR2) sidelink, the sidelink device 502a (e.g., the transmitting sidelink device 502a) may transmit data over the FR2 sidelink to the sidelink device 502b (e.g., the receiving or target sidelink device). In some examples, the transmitting sidelink device 502a may transmit a PSCCH over the FR2 sidelink to the target sidelink device 502b utilizing the selected BPL (e.g., beams 506a and 506b). The PSCCH may include SCI containing scheduling information indicating the resources (e.g., one or more resource blocks) reserved by the transmitting sidelink device 502a to transmit a PSSCH containing data. The transmitting sidelink device 502a may then transmit the PSSCH including the data within the reserved resources over the FR2 sidelink to the target sidelink device 502b utilizing the transmit and receive beams 506a and 506b.

Neighboring sidelink devices (e.g., sidelink devices 502c and 502d) may need to have knowledge of the resources reserved for the PSSCH transmission to avoid collisions. However, due to the directional nature of transmit beam 506a, other neighboring sidelink devices may not receive the PSCCH, and as a result, not be aware of the reservation of PSSCH resources by the transmitting sidelink device 502a. For example, neighboring sidelink devices 502c and 502d may be communicating over another FR2 sidelink utilizing a respective BPL (e.g., transmit and receive beams 506c and 506d). If the sidelink device 502c did not receive the PSCCH from the sidelink device 502a, the sidelink device 502c may select the same resources for another PSSCH transmitted from sidelink device 502c to sidelink device 502d, thus creating interference between the two PSSCH transmissions. Therefore, to avoid such interference, the transmitting sidelink device 502a may perform a beam sweep of the PSCCH in FR2 (e.g., transmit the PSCCH on each of beams 506e-506g) to inform other neighboring sidelink devices (e.g., sidelink device 502c) of the resources reserved by the sidelink device 502a for upcoming PSSCH transmissions. However, broadcasting the reserved unicast resources in multiple beams may lead to undesirable overhead.

Therefore, in various aspects of the disclosure, the transmitting sidelink device 502a may be configured to perform cross-link scheduling to transmit the PSCCH on a sub-6 GHz frequency band (e.g., an FR1 sidelink) and the PSSCH on a mmWave frequency band (e.g., an FR2 sidelink). By utilizing cross-link scheduling for sidelink unicast transmissions, the physical control information (PSCCH) may be transmitted over the more reliable FR1 sidelink with larger coverage than the FR2 sidelink. In addition, the FR1 sidelink may be less susceptible to changes of position or antenna orientation of the transmitting and receiving devices than the FR2 sidelink. Furthermore, cross-link scheduling may also avoid broadcasting the reserved FR2 unicast resources via beam sweeping to multiple neighboring sidelink devices within a communication range of the transmitting sidelink device.

Cross-link scheduling may further avoid reserving resources at the transmitting sidelink device (e.g., sidelink device 502a) for BPL determination for the transmission of control information when the sidelink device 502a has FR2 sidelinks with multiple neighboring sidelink devices (e.g., sidelink devices 502b-502d) and the same data is to be transmitted to each of the neighboring sidelink devices. This scenario may be likely in a V2X network, in which V2X data (e.g., position, speed, acceleration, trajectory, etc.) may be transmitted to multiple neighboring V2X devices. For example, if transmitting sidelink device 502a has a respective FR2 sidelink established with each of the neighboring sidelink devices 502b, 502c, and 502d, in order to transmit a PSCCH to each sidelink device 502b, 502c, and 502d on a respective transmit beam, the transmitting sidelink device may utilize a predetermined schedule (e.g., slot 1 for sidelink device 502b, slot 2 for sidelink device 502c, and slot 3 for sidelink device 502d) to transmit on each of the beams. Such a predetermined schedule between sidelinks may increase the amount of resources and time for transmitting the PSCCH. Instead, by transmitting the PSCCH on the FR1 sidelink, the transmitting sidelink device 502a may transmit the respective PSCCH for each neighboring sidelink device 502b, 502c, and 502d within a single slot (utilizing a single omni-directional beam). In addition, by transmitting the PSCCH on the FR1 sidelink via an omni-directional beam, the transmitting sidelink device 502a does not need to select a particular BPL until transmission of the PSSCH.

It should be noted that if a receiving sidelink device (e.g., sidelink device 502b) receives multiple PSCCH from multiple neighboring devices (e.g., sidelink devices 502a, 502c, and 502d) and is not able to beamform to all of the requested directions indicated by the multiple PSCCH (e.g., due to hardware constraints), the receiving sidelink device 502b may prioritize transmissions (PSSCH) as a function of Quality of Service (QoS) requirements of the different transmissions.

In some examples, the sidelink devices 502a-502d may be configured to communicate on two or more mmWave frequency bands (e.g., two or more FR2 bands with two or more FR2 carrier frequencies). Each FR2 band may be considered a component carrier. For a particular FR2 sidelink (e.g., between sidelink device 502a and 502b), two or more of the component carriers may be aggregated to increase throughput on the FR2 sidelink. The number of component carriers selected for the FR2 sidelink may be dependent upon the desired performance of the FR2 sidelink. In other examples, a particular sidelink device (e.g., sidelink device 502a) may form two or more FR2 sidelinks with respective other sidelink devices (e.g., sidelink devices 502b and 502c) and utilize a different component carrier on each of the FR2 sidelinks to mitigate interference between the FR2 sidelinks.

Figure 6:
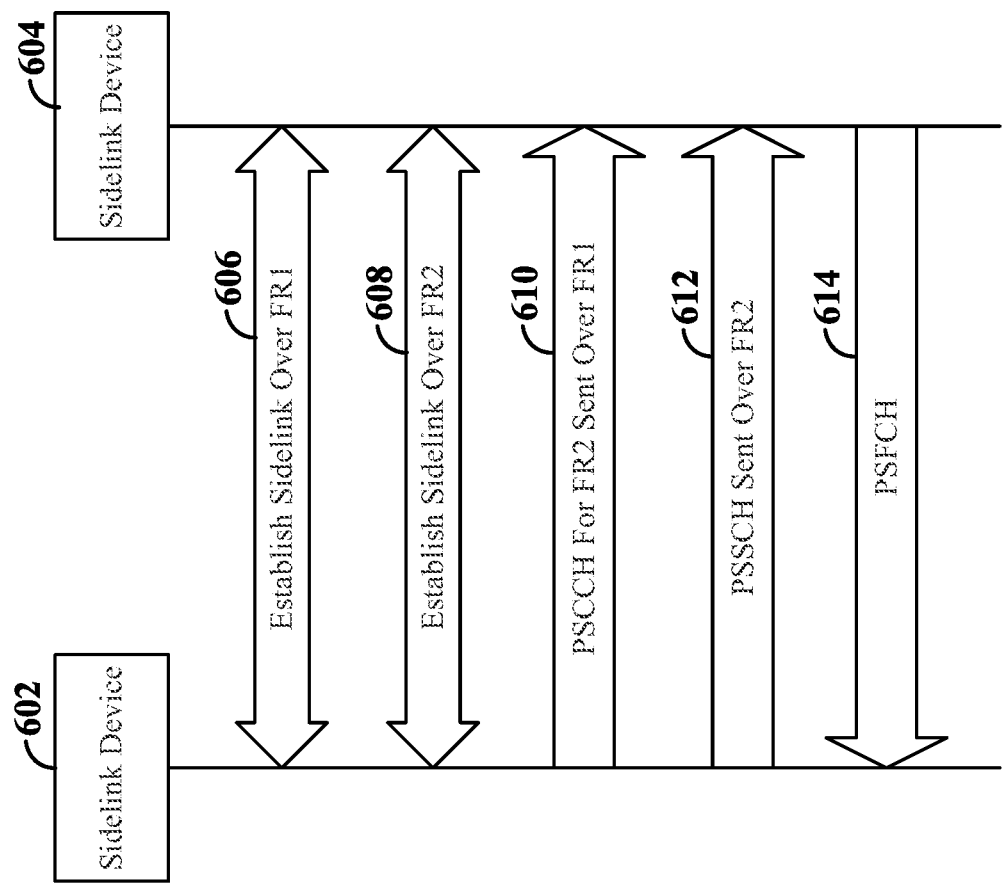
FIG. 6 is a signaling diagram illustrating an exemplary flow for performing cross-link scheduling of a transmission.

FIG. 6 is a signaling diagram illustrating an exemplary flow for performing cross-link scheduling of a transmission between sidelink devices 602 and 604 in, for example, a V2X NSA deployment. The sidelink devices 602 and 604 may correspond, for example, to sidelink devices shown in FIG. 5 and/or V2X devices shown in FIG. 2. In the example shown in FIG. 6, sidelink device 602 may be referred to as the transmitting sidelink device, while sidelink device 604 may be referred to as the receiving sidelink device.

At 606, the transmitting and receiving sidelink devices 602 and 604 may initially establish a sidelink over a first frequency band FR1 (e.g., a sub-6 GHz frequency band), as described above in connection with FIG. 5. For example, after discovery (e.g., using a V2V peer discovery procedure), the transmitting sidelink device 602 may establish a radio resource control (RRC) connection and a signaling radio bearer (SRB) for the FR1 sidelink. A SRB is a logical communication channel on L2 and higher layers for the transfer of control information for a communication session. For example, the SRB may carry a dedicated control channel (DCCH) including PHY layer, MAC layer, and other access layer control information to initiate the communication session. Using the SRB, the configuration of the L2 and higher protocol layers is of a semi-static nature that occurs during set-up of the communication session. PHY layer control is more dynamic in nature based on resource allocation (e.g., time, frequency, space, and/or power), and thus, PHY layer control and adaption typically occur at the time that data is being exchanged (e.g., transmitted/received).

The SRB may further establish one or more data radio bearers (DRBs) for the communication session. A data radio bearer is a logical communication on L2 and higher layers for the transfer of data for the communication session. For example, a DRB carries dedicated traffic channel (DTCH) data for a communication session. A DRB may be established using a radio bearer (RB) setup procedure on the SRB.

At 608, the transmitting and receiving sidelink devices 602 and 604 may further establish a sidelink over a second frequency band FR2 (e.g., a mmWave frequency band) using a NSA deployment, as described above in connection with FIG. 5. For example, the FR2 sidelink may be established with the support of the previously established sidelink on FR1. In particular, the SRB established on FR1 may be utilized to establish a DRB on FR2. In an example, the transmitting sidelink device 602 may determine that a data flow for the receiving sidelink device 604 should be transmitted over FR2. In some examples, the transmitting sidelink device 602 may determine that FR2 should be utilized for the data flow based on a QoS of the data flow (e.g., data rate, throughput, latency, etc.), configuration information (e.g., provided by a network entity, such as a base station, or an application server), negotiation with the receiving sidelink device 604 and/or a particular QoS-to-sidelink radio bearer (SLRB) mapping.

The transmitting sidelink device 602 may then transmit an RRC reconfiguration message over the previously established SRB on FR1 to initiate establishment of the FR2 sidelink. For example, the RRC reconfiguration message sent on FR1 may be utilized to configure L2 and higher layers, along with mmWave PHY configurations for beam direction(s) and resource, timing, location, and/or sequence parameters for L1/L2 procedures. The sidelink devices 602 and 604 may then perform PHY/MAC procedures in FR2 to select the BPL, perform synchronization, and establish the FR2 sidelink. For example, the sidelink devices 602 and 604 may utilize the geographical locations (e.g., GPS coordinates) and V2X data exchanged during establishment of the FR1 sidelink to aid in selection of the BPL. Thus, signaling on the SRB on FR1 is used to establish the FR2 physical channel (FR2 sidelink) and to add a new DRB on FR2. In some examples, the FR2 sidelink may be established over two or more FR2 bands (component carriers) and the sidelink devices 602 and 604 may implement carrier aggregation to communicate over the FR2 sidelink. In this example, the RRC reconfiguration message or sidelink control information (SCI) in a PSCCH transmitted on the FR1 sidelink may indicate the FR2 carrier frequency identities (IDs) and corresponding physical resources in the corresponding FR2 carrier frequencies. Similarly, if a single FR2 component carrier is selected for the FR2 sidelink, the RRC reconfiguration message or SCI sent on the FR1 sidelink may identify the carrier frequency ID of the selected FR2 component carrier.

After considering QoS constraints and priorities, the transmitting sidelink device 602 may then determine to transmit a data packet to the receiving sidelink device 604 over the FR2 sidelink. At 610, the transmitting sidelink device 602 may then generate and transmit a PSCCH including sidelink control information (SCI) for the FR2 sidelink over the FR1 sidelink. For example, the SCI may include resource information indicating the time-frequency resources reserved for the transmission of the data packet on FR2, HARQ information (e.g., HARQ ID and an indication whether the data packet is a new data packet or a retransmitted data packet), and other link adaptation information, such as the modulation and coding scheme (MCS) and power control commands.

At 612, the transmitting sidelink device 602 may then transmit the data packet within a PSSCH to the receiving sidelink device 604 over the FR2 sidelink. In particular, the transmitting sidelink device 602 may transmit the PSSCH on the resources indicated in the PSCCH transmitted over the FR1 sidelink. In addition, the transmitting sidelink device 602 may utilize the BPL selected in 608 based on the device location information shared in 606. In some examples, one or more reference signals (e.g., a DMRS) may further be transmitted on the FR2 sidelink to enable channel estimation and feedback of channel state information (CSI). For example, the CSI may include a channel quality indicator (CQI), precoding matrix index (PMI), and a rank indicator (RI) for MIMO communications.

At 614, the receiving sidelink device 604 may transmit an acknowledgement (ACK) or negative acknowledgement (NACK) based on the HARQ information over a physical sidelink feedback control channel (PSFCH). In some examples, the receiving sidelink device 604 may transmit the PSFCH over the FR1 sidelink. In other examples, the receiving sidelink device 604 may transmit the PSFCH over the FR2 sidelink.

In some examples, the transmitting sidelink device 602 may further determine the link adaptation information for the data packet sent over FR2 based on channel state feedback provided by the receiving sidelink device 604. For example, the transmitting sidelink device 602 may transmit an RRC message or DCI on FR1 indicating a configuration of one or more reference signals or pilots, such as the CSI-RS, DMRS, etc., to be transmitted on FR2. The transmitting device 602 may then transmit the reference signals on FR2, in accordance with the configuration, for use by the receiving sidelink device 604 in measuring the channel quality. The receiving device 604 can then return a CSI report including, for example, the CQI, PMI, RI, and other suitable parameters, to the transmitting device 602 over FR1 or FR2. In some examples, the CSI report may be sent within the PSFCH. In examples in which the FR2 sidelink includes multiple component carriers, the transmitting sidelink device 602 may transmit reference signals in each of the FR2 component carriers and the receiving sidelink device 604 may return a respective CSI report for each of the FR2 component carriers.

Within a sidelink network, quality of service (QoS) and system performance may be affected by timing misalignments between sidelink devices. Therefore, to maintain a common synchronization of time and frequency among the sidelink devices, each of the sidelink devices may be synchronized either to a synchronization source, such as a gNB, eNB, or global navigation satellite system (GNSS), or based on a time/frequency reference within a sidelink device. One or more sidelink devices may further generate and transmit synchronization information for use by other sidelink devices in synchronizing the radio frame timing (e.g., radio frame/slot boundaries and frame index) to the transmitting sidelink device. For example, the synchronization information may include a sidelink synchronization signal (S-SS). In some examples, the S-SS may be part of a sidelink synchronization block (S-SSB), which includes a sidelink primary synchronization signal (S-PSS), sidelink secondary synchronization signal (S-SSS), and a physical sidelink broadcast channel (PSBCH). The S-SSB may further include a downlink modulation reference signal (DMRS), or other signals used for synchronization.

In some examples, sub-6 GHz (e.g., FR1) sidelinks and mmWave (e.g., FR2) sidelinks may each be synchronized based on different reference synchronization sources. As a result, the timing between the FR1 PSCCH and FR2 PSSCH may be different. For example, with reference now to FIGS. 7A and 7B, FR1 may include a first carrier frequency time-divided into a first plurality of slots 702a, while FR2 may include a second carrier frequency time-divided into a second plurality of slots 702b. The slot boundaries of the first plurality of slots 702a are misaligned with the slot boundaries of the second plurality of slots 702b such that there is a timing offset $t_O$ between respective slot boundaries of a first FR1 slot 702 and a first FR2 slot.

Figure 7B:
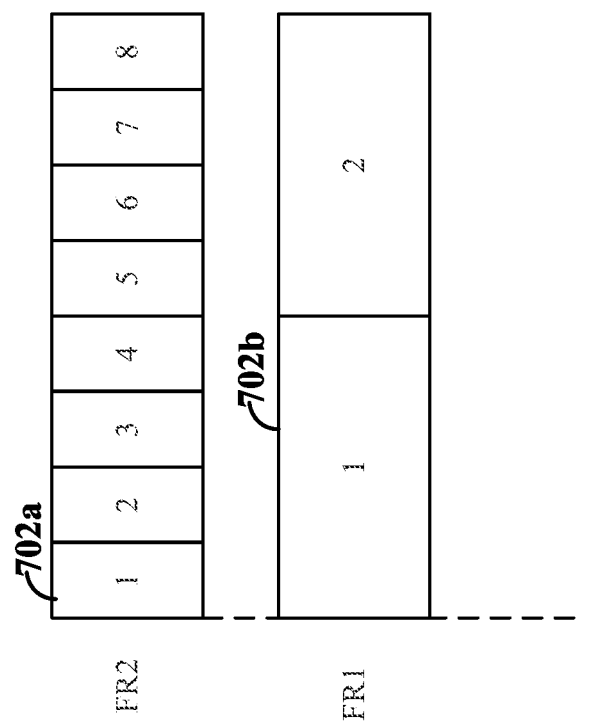
FIGS. 7A and 7B illustrate exemplary timing offsets between frequency bands utilized in a sidelink wireless communication network.
Figure 7A:
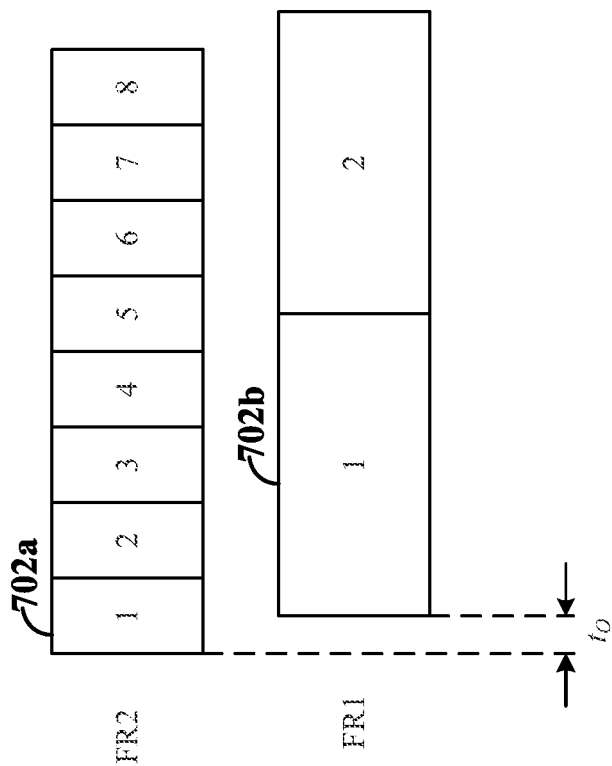

In the example shown in FIGS. 7A and 7B, the numerology (e.g., subcarrier spacing (SCS)) between FR1 and FR2 is different. As a result, the slot duration and number of RBs per slot is different in the first plurality of slots 702a and the second plurality of slots 702b. For example, the SCS may be 30 kHz for FR1 and 120 kHz for FR2. Therefore, as shown in FIGS. 7A and 7B, the slot duration of one slot 702b in FR1 is equivalent to the slot duration of four slots 702a in FR2. In addition, in the frequency domain, four RBs in FR1 correspond in bandwidth to one RB in FR2. In this example, the timing offset $t_O$ is determined based on the slot boundaries of one FR1 slot and a set of four FR2 slots to account for the different SCS utilized in each of FR1 and FR2. The particular SCS (e.g., the SCS for a selected BWP) and other related frequency domain reference information for FR1 and FR2 may be exchanged between sidelink devices during establishment of the FR1 sidelink and the FR2 sidelink.

With knowledge of the SCS and timing of both the FR1 and FR2, the sidelink devices may determine the timing offset $t_O$ and synchronize the timing on the FR1 sidelink and the FR2 sidelink for cross-link scheduling. In some examples, at the time of the NSA call set-up procedure in FR1 for FR2, the sidelink devices may exchange synchronization reference information (e.g., an S-SS or S-SSB for both FR1 and FR2) indicating a timing offset $t_O$ between FR1 and FR2 (e.g., the sidelink devices may determine the timing offset $t_O$ based on the synchronization reference information and the respective SCS in FR1 and FR2).

In some examples, as shown in FIG. 7B, the sidelink devices may synchronize the timing by aligning respective slot boundaries between the first plurality of slots and the second plurality of slots to accommodate the timing offset. For example, the sidelink devices may align the time reference of FR2 (with larger SCS) with the time reference of FR1 to align the respective slot boundaries based on the SCS. In other examples, instead of aligning the slot boundaries, the transmitting sidelink device may synchronize the timing by scheduling the PSCCH and PSSCH based on the timing offset. For example, as shown in FIG. 7A, the transmitting sidelink device may transmit a PSCCH within slot 1 of FR1. The PSCCH may include scheduling information for a PSSCH to be transmitted in any one or more of slots 2-8 of FR2.

In some examples, the PSCCH may include SCI containing resource information indicating resources on which the PSSCH is to be transmitted. The resource information may be generated based on the SCS and BWP of FR1 or the SCS and BWP of FR2. The SCI may contain further information indicating the targeted frequency band for FR2 and other control information, such as HARQ related information and link adaptation information (the modulation and coding scheme (MCS), power control commands, etc.).

Figure 8:
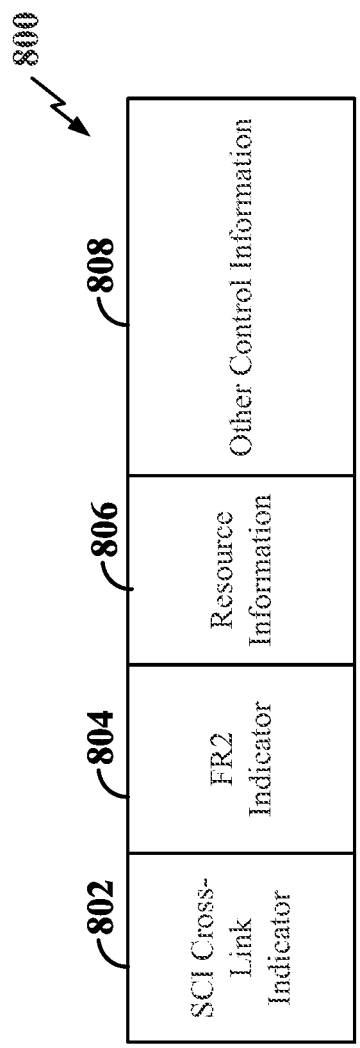
FIG. 8 is a diagram illustrating an exemplary format of sidelink control information (SCI) for cross-link scheduling.

FIG. 8 is a diagram illustrating an exemplary format of sidelink control information (SCI) 800 for cross-link scheduling. The SCI 800 includes a SCI cross-link indicator 802 indicating that the SCI is cross-link scheduling the PSSCH on the FR2 sidelink. The SCI 800 further includes an FR2 indicator 804 identifying the frequency band on which the PSSCH is to be transmitted (e.g., the frequency band utilized for the FR2 sidelink).

The SCI 800 further includes resource information 806 indicating the resources (e.g., time-frequency resources) on which the PSSCH is to be transmitted. For example, the resource information 806 may indicate a starting RB and number of RBs allocated for the PSSCH on FR2. In addition, the resource information 806 may indicate a starting time and duration of time of the resources allocated on FR2 for the PSSCH. However, since the resource information 806 is generated for transmission on the FR1 sidelink (e.g., via the PSCCH sent on the FR sidelink), the resource information 806 may be generated for FR2 based on sidelink parameters (e.g., SCS and BWP) associated with FR1.

In some examples, the transmitting sidelink device may translate the resource information generated based on the FR1 sidelink into translated resource information that is based on FR2 sidelink parameters and transmit the translated resource information 806 within the SC. For example, the receiving sidelink device may translate the starting RB and number of RBs generated based on the SCS and BWP of the FR1 sidelink into a translated starting RB and translated number of RBs based on the SCS and BWP of the FR2 sidelink. As an example, the generated resource information may indicate a starting RB within the BWP of FR1 and a number of RBs based on the SCS of FR1. The transmitting sidelink device may translate the starting RB in FR1 to the BWP of FR2 and the number of RBs in FR1 to the corresponding number of RBs in FR2 based on the SCS difference between FR1 and FR2. Using the example shown in FIGS. 7A and 7B, if the generated resource information indicates that the number of RBs in FR1 is twelve RBs, the transmitting sidelink device may translate the number of RBs in FR2 to three RBs.

As another example, the transmitting sidelink device may translate the starting time and duration of time of resources allocated based on the SCS of FR1 into the starting time and duration of time based on the SCS of FR2. As an example, the generated resource information may indicate a starting slot and number of slots within FR1 over which the PSSCH will be transmitted. The transmitting sidelink device may translate the starting slot in FR1 to a corresponding starting slot in FR2 and may further translate the number of slots in FR1 into the corresponding number of slots in FR2. Using the example shown in FIGS. 7A and 7B, if the generated resource information indicates that the number of slots in FR1 is two slots in FR1, the transmitting sidelink device may translate the number of slots to eight slots in FR2.

Thus, the translated resource information 806 transmitted on the PSCCH may indicate a starting RB and number of RBs allocated for the PSSCH on FR2 based on the timing, BWP, and SCS associated with the FR2 sidelink. In addition, the translated resource information 806 may indicate a starting time and duration of time of the resources allocated on FR2 for the PSSCH based on the timing, BWP, and SCS associated with the FR2 sidelink. In this example, the receiving sidelink device may directly utilize the translated resource information 806 to identify the specific time-frequency resources on which to receive the PSSCH.

In other examples, the resource information 806 included in the SCI 800 may be the original resource information generated based on the FR1 sidelink parameters. In this example, the receiving sidelink device may translate the received resource information 806 generated based on the FR1 sidelink parameters into translated resource information that is based on FR2 sidelink parameters. For example, the receiving sidelink device may translate the starting RB and number of RBs generated based on the SCS and BWP of the FR1 sidelink into a translated starting RB and translated number of RBs based on the SCS and BWP of the FR2 sidelink, as described above. As another example, the receiving sidelink device may translate the starting time and duration of time of resources allocated based on the SCS of FR1 into the starting time and duration of time based on the SCS of FR2, as described above.

Figure 9:
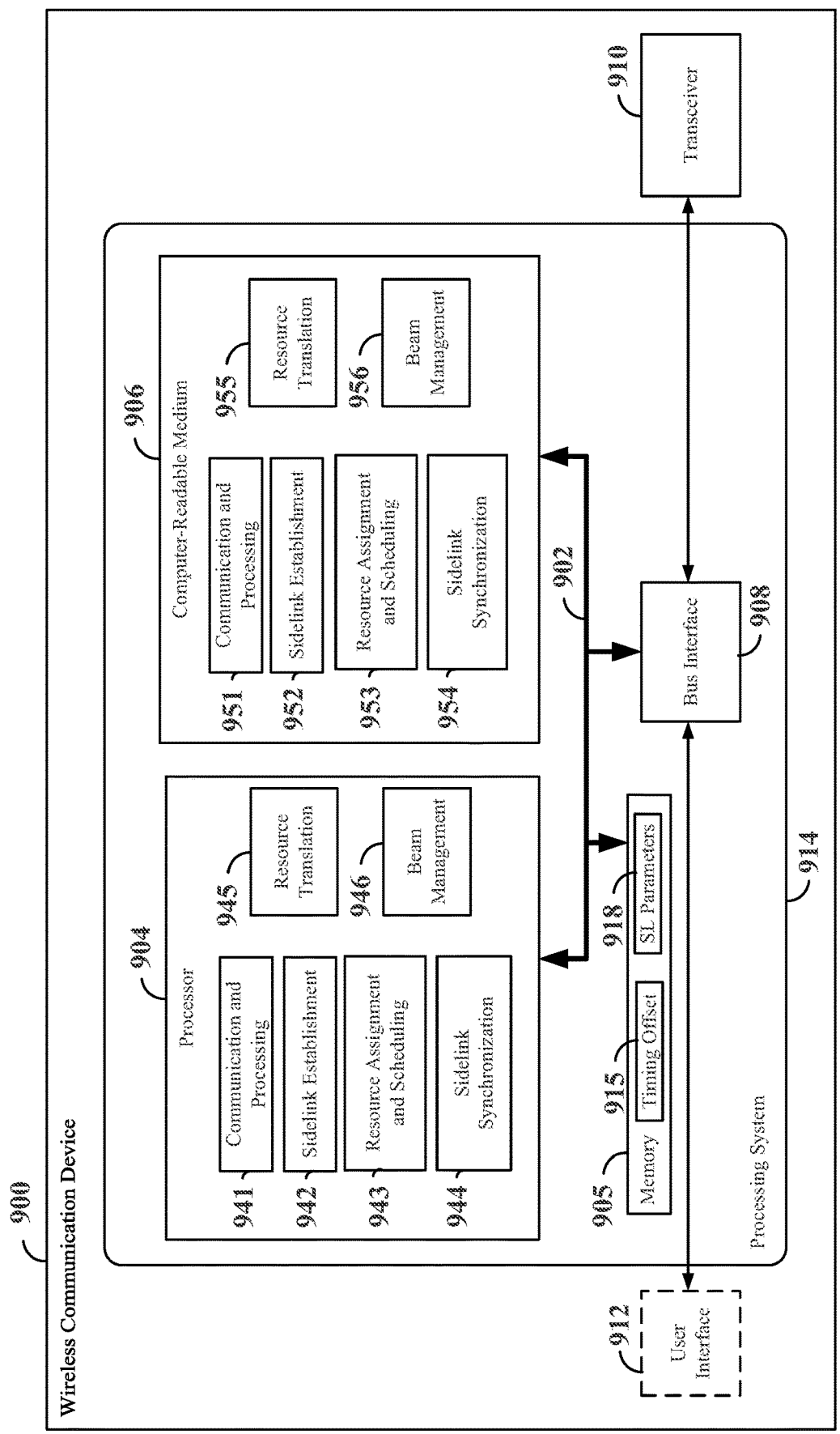
FIG. 9 is a diagram illustrating an example of a hardware implementation for a wireless communication device employing a processing system.

FIG. 9 is a block diagram illustrating an example of a hardware implementation for a wireless communication device 900 employing a processing system 914. For example, the wireless communication device 900 may correspond to a UE, a V2X device, D2D device or other suitable sidelink device, as shown and described above in reference to FIGS. 1, 2, 5, and/or 6.

The wireless communication device 900 may be implemented with a processing system 914 that includes one or more processors 904. Examples of processors 904 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the wireless communication device 900 may be configured to perform any one or more of the functions described herein. That is, the processor 904, as utilized in the wireless communication device 900, may be used to implement any one or more of the processes and procedures described below.

In this example, the processing system 914 may be implemented with a bus architecture, represented generally by the bus 902. The bus 902 may include any number of interconnecting buses and bridges depending on the specific application of the processing system 914 and the overall design constraints. The bus 902 links together various circuits including one or more processors (represented generally by the processor 904), a memory 905, and computer-readable media (represented generally by the computer-readable medium 906). The bus 902 may also link various other circuits such as timing sources, peripherals, voltage regulators, and power management circuits, which are well known in the art, and therefore, will not be described any further.

A bus interface 908 provides an interface between the bus 902 and a transceiver 910. The transceiver 910 provides a means for communicating with various other apparatus over a transmission medium (e.g., air interface). Depending upon the nature of the apparatus, a user interface 912 (e.g., keypad, display, touch screen, speaker, microphone, control knobs, etc.) may also be provided. Of course, such a user interface 912 is optional, and may be omitted in some examples.

The processor 904 is responsible for managing the bus 902 and general processing, including the execution of software stored on the computer-readable medium 906. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software, when executed by the processor 904, causes the processing system 914 to perform the various functions described below for any particular apparatus. The computer-readable medium 906 and the memory 905 may also be used for storing data that is manipulated by the processor 904 when executing software.

The computer-readable medium 906 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 906 may reside in the processing system 914, external to the processing system 914, or distributed across multiple entities including the processing system 914. The computer-readable medium 906 may be embodied in a computer program product. By way of example, a computer program product may include a computer-readable medium in packaging materials. In some examples, the computer-readable medium 906 may be part of the memory 905. Those skilled in the art will recognize how best to implement the described functionality presented throughout this disclosure depending on the particular application and the overall design constraints imposed on the overall system.

In some aspects of the disclosure, the processor 904 may include circuitry configured for various functions. For example, the processor 904 may include communication and processing circuitry 941 configured to communicate over a sidelink carrier to exchange sidelink control information and sidelink data with other sidelink devices via the transceiver 910 and an associated antenna and/or antenna array(s) (e.g., antenna(s) 404 or 408 shown in FIG. 4). In some examples, the communication and processing circuitry 941 may be configured to communicate with other sidelink devices over multiple sidelink carriers, each associated with one or more sidelinks. For example, the communication and processing circuitry 941 may be configured to communicate over an FR1 carrier (e.g., a sub-6 GHz carrier) and one or more FR2 carriers (e.g., a mmWave carrier).

Each sidelink carrier may be time-divided into a plurality of radio frames, each of which may be time-divided into a plurality of subframes and slots, such as the slots shown in FIGS. 7A and 7B. In some examples, the communication and processing circuitry 941 may be configured to transmit a PSCCH, which may include sidelink control (e.g., sidelink control information (SCI)) associated with data to be transmitted. The PSCCH may further include a sidelink synchronization signal (S-SS), other control information, and/or pilot signals. The communication and processing circuitry 941 may further be configured to transmit a PSSCH, which may include the data referenced in the PSCCH.

In some examples, the communication and processing circuitry 941 may be configured to transmit the PSCCH within a slot on the FR1 carrier, and the PSSCH within a slot on the FR2 carrier. In addition, the communication and processing circuitry 941 may further be configured to receive a PSFCH from the other sidelink device within a slot on the FR1 carrier or the FR2 carrier. The communication and processing circuitry 941 may further be configured to transmit reference signal configuration information on the FR1 carrier and one or more reference signals (in accordance with the reference signal configuration) on the FR2 carrier (or FR2 carriers). In addition, the communication and processing circuitry 941 may be configured to receive a CSI report (e.g., within a PSFCH) on the FR1 carrier or the FR2 carrier. In an example in which the FR2 sidelink includes multiple component carriers, the SCI transmitted on the FR1 sidelink may further include a respective carrier frequency ID for each of the FR2 component carriers.

In examples in which the wireless communication device 900 is a receiving sidelink device, the communication and processing circuitry 941 may be configured to receive a PSCCH within a slot on the FR1 carrier. The communication and processing circuitry 941 may further be configured to receive the PSSCH within a slot on the FR2 carrier. Furthermore, the communication and processing circuitry 941 may be configured to transmit the PSFCH within a slot on the FR1 carrier or the FR2 carrier. Similarly, the communication and processing circuitry 941 may be configured to receive the reference signal configuration on the FR1 carrier and the one or more reference signals on the FR2 carrier. The communication and processing circuitry 941 may then be configured to transmit a CSI report (e.g., within the PSFCH) on either the FR1 carrier or the FR2 carrier. The communication and processing circuitry 941 may further be configured to execute communication and processing software 951 stored on the computer-readable medium 906 to implement one or more functions described herein.

The processor 904 may further include sidelink establishment circuitry 942, configured to establish one or more sidelinks with other sidelink devices on one or more sidelink carriers. In some examples, the sidelink establishment circuitry 942 may be configured to establish an FR1 sidelink over the FR1 sidelink carrier (e.g., of a sub-6 GHz frequency band) with another sidelink device, as described above in connection with FIGS. 5 and/or 6. In some examples, the FR1 sidelink may utilize an omni-directional beam to communicate with the other sidelink.

The sidelink establishment circuitry 942 may further be configured to establish an FR2 sidelink over the FR2 sidelink carrier (e.g., of a mmWave frequency band) with the other sidelink device using a NSA deployment, as described above in connection with FIGS. 5 and/or 6. For example, the FR2 sidelink with the other sidelink device may be established with the support of the previously established sidelink on FR1 with the same other sidelink device. In particular, the SRB established on FR1 may be utilized to establish a DRB on FR2. In some examples, the FR2 sidelink may utilize a directional beam to communicate with the other sidelink device on the FR2 sidelink.

Upon establishing the FR1 sidelink and the FR2 sidelink with the other sidelink device, the communication and processing circuitry 941 may be configured to communicate over each of the FR1 sidelink and the FR2 sidelink to transmit the PSCCH and PSSCH to the other sidelink device, as discussed above. In some examples, the communication and processing circuitry 941 may further be configured to communicate with neighboring sidelink devices within range of the omni-directional beam via respective FR1 sidelinks with the neighboring sidelink devices. In addition, the communication and processing circuitry 941 may be configured to communicate with neighboring sidelink devices via respective directional FR2 beams and FR2 sidelinks. The sidelink establishment circuitry 942 may further be configured to execute sidelink establishment software 952 stored on the computer-readable medium 906 to implement one or more functions described herein.

The processor 904 may further include resource assignment and scheduling circuitry 943, configured to generate, schedule, and modify a reservation of time-frequency resources (e.g., a set of one or more resource elements). For example, the resource assignment and scheduling circuitry 943 may reserve time-frequency resources on FR1 (e.g., within one or more slots on the FR1 carrier) to carry a PSCCH and additional time-frequency resources on FR2 (e.g., within one or more slots on the FR2 carrier) to carry a PSSCH. The resource assignment and scheduling circuitry 943 may further be configured to utilize an omni-directional beam to carry the PSCCH on the FR1 carrier and a directional beam (e.g., a selected BPL) to carry the PSSCH on the FR2 carrier.

In some examples, the resource assignment and scheduling circuitry 943 may further be configured to avoid scheduling a PSSCH on resources in FR2 reserved for another PSSCH communicated between other sidelink devices. For example, the communication and processing circuitry 941 may be configured to receive a PSCCH transmitted by a transmitting sidelink device on FR1 (e.g., via an FR1 sidelink between the transmitting sidelink device and the wireless communication device 900). When the PSCCH includes an indicator that the SCI in the PSCCH is scheduling a PSSCH on resources within FR2 (e.g., where the wireless communication device 900 or another receiving sidelink device may be the target of the PSSCH), the resource assignment and scheduling circuitry 943 may avoid scheduling another PSSCH for transmission on the same resources within FR2 indicated by the PSCCH. The resource assignment and scheduling circuitry 943 may further be configured to execute resource assignment and scheduling software 953 stored on the computer-readable medium 906 to implement one or more of the functions described herein.

The processor 904 may further include sidelink synchronization circuitry 944, configured to synchronize timing on the FR1 sidelink and the FR2 sidelink with another sidelink device. In some examples, the sidelink synchronization circuitry 944 may exchange synchronization reference information with the other sidelink device on both the FR1 sidelink and the FR2 sidelink. The synchronization reference information for each sidelink (FR1 and FR2) may include, for example, a sidelink synchronization signal (S-SS) indicating the sidelink transmission timing utilized by each sidelink device (e.g., as determined based on synchronization to a synchronization source (e.g., gNB, eNB, GNSS, etc.), self-synchronization to an internal timing/frequency reference, or synchronization to another sidelink device).

The sidelink synchronization circuitry 944 may utilize the synchronization reference information to synchronize each individual sidelink (e.g., the FR1 sidelink and the FR2 sidelink) and to further determine whether, after synchronization of the individual sidelinks, a timing offset 915 exists between the FR1 sidelink and the FR2 sidelink. For example, the sidelink synchronization circuitry 944 may determine that a timing offset 915 is present between a first plurality of slots communicated on the FR1 sidelink and a second plurality of slots communicated on the FR2 sidelink. The timing offset 915 may be indicative of a time difference between respective slot boundaries of the first plurality of slots and the second plurality of slots based on the respective SCS in each of the frequency bands (FR1 and FR2).

In some examples, when the sidelink synchronization circuitry 944 determines that a timing offset 915 exists between the FR1 sidelink and the FR2 sidelink, the sidelink synchronization circuitry 944 may align respective slot boundaries between the first plurality of slots and the second plurality of slots based on the respective SCS in each of the frequency bands to eliminate the timing offset 915. In other examples, the sidelink synchronization circuitry 944 may store the timing offset 915 within, for example, the memory 905. The timing offset 915 may then be utilized by the resource assignment and scheduling circuitry 943 in cross-link scheduling of the PSCCH and PSSCH based on the timing offset 915. The sidelink synchronization circuitry 944 may further be configured to execute sidelink synchronization software 954 stored on the computer-readable medium 906 to implement one or more of the functions described herein.

The processor 904 may further include resource translation circuitry 945, configured to account for SCS and BWP differences between frequency bands (FR1 and FR2) when implementing cross-link scheduling of the PSSCH. In some examples, the resource translation circuitry 945 may operate in conjunction with the resource assignment and scheduling circuitry 943 to translate resource information generated by the resource assignment and scheduling circuitry 943 based on sidelink (SL) parameters 918 associated with FR1 into translated resource information based on SL parameters 918 associated with FR2. The SL parameters 918 (e.g., SCS, BWP, etc.) for each frequency band (FR1 and FR2) may be stored, for example, in memory 905, and may further be utilized by the resource translation circuitry 945 to perform the resource translation. For example, the translated resource information may indicate a starting RB and number of RBs allocated for the PSSCH on FR2. In addition, the translated resource information may indicate a starting time and duration of time of the resources allocated on FR2 for the PSSCH. The translated resource information may be provided by the resource translation circuitry 945 to the resource assignment and scheduling circuitry 943 and communication and processing circuitry 941 for inclusion in SCI within a PSCCH to be transmitted by the wireless communication device 900 on FR1.

In other examples, the resource translation circuitry 945 may receive the resource information included in a received PSCCH from the communication and processing circuitry 941 and translate the received resource information for use by the communication and processing circuitry 941 in receiving the PSSCH. In this example, the wireless communication device 900 is a receiving sidelink device that may translate the received resource information generated based on the FR1 sidelink parameters into translated resource information that is based on FR2 sidelink parameters. For example, the receiving sidelink device may translate the starting RB and number of RBs generated based on the SCS and BWP of the FR1 sidelink into a translated starting RB and translated number of RBs based on the SCS and BWP of the FR2 sidelink, as described above. As another example, the receiving sidelink device may translate the starting time and duration of time of resources allocated based on the SCS of FR1 into the starting time and duration of time based on the SCS of FR2, as described above. The resource translation circuitry 945 may further be configured to execute resource translation software 955 stored on the computer-readable medium 906 to implement one or more of the functions described herein.

The processor 904 may further include beam management circuitry 946, configured to select a particular beam (or BPL) for a communication with another sidelink device. In some examples, the beam management circuitry 946 may be configured to select an omni-directional beam when the communication is to be transmitted over the FR1 and a BPL when the communication is to be transmitted over the FR2. In some examples, the particular BPL between the wireless communication device 900 and another sidelink device may be selected based on shared device location information exchanged between the sidelink devices during setup of the FR2 sidelink. The beam management circuitry 946 may further be configured to execute beam management software 956 stored on the computer-readable medium 906 to implement one or more of the functions described herein.

Figure 10:
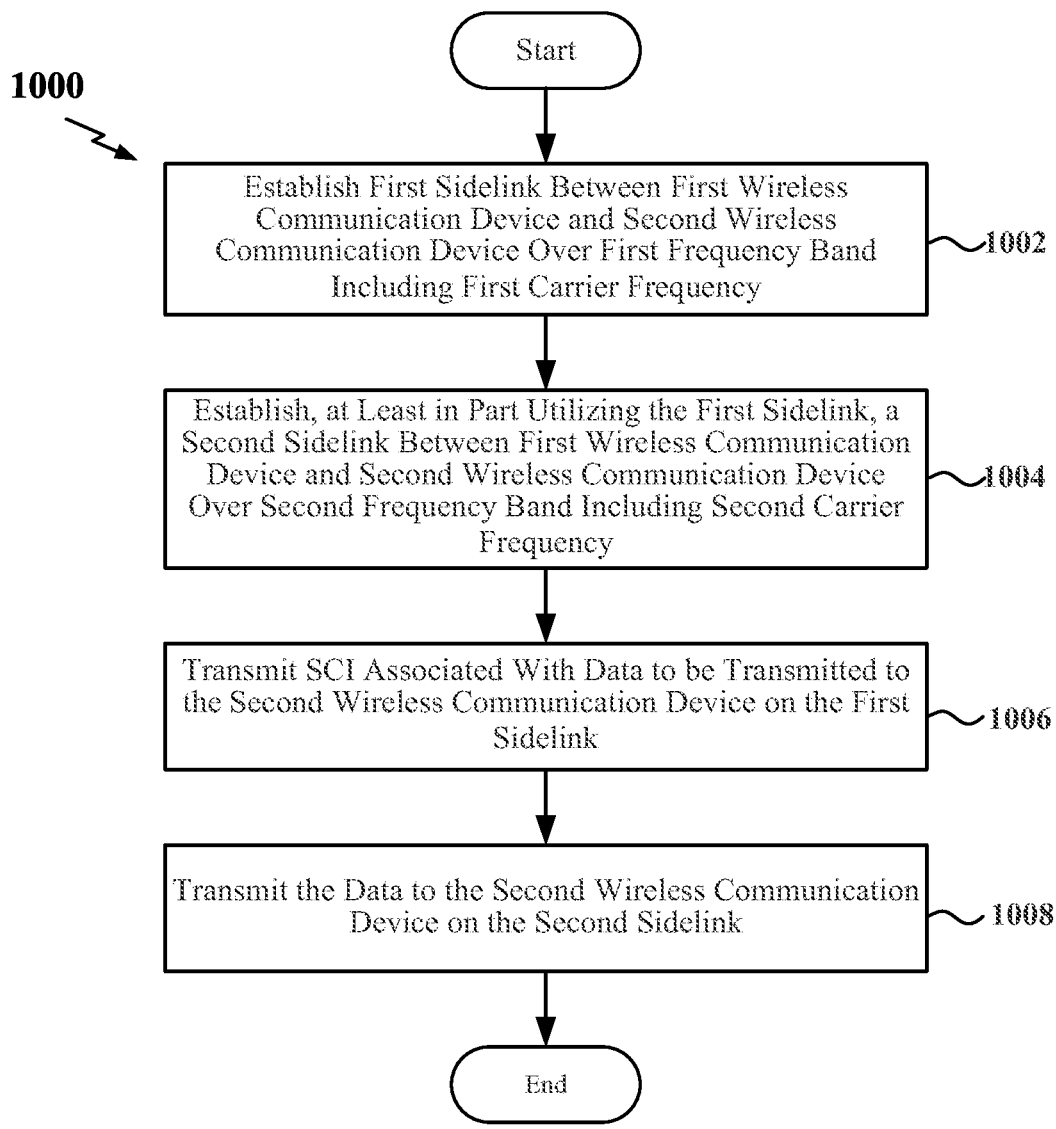
FIG. 10 is a flow chart of an exemplary method of wireless communication at a transmitting wireless communication device.

FIG. 10 is a flow chart 1000 of a method for wireless communication at a first wireless communication device (e.g., transmitting sidelink device). As described below, some or all illustrated features may be omitted in a particular implementation within the scope of the present disclosure, and some illustrated features may not be required for implementation of all embodiments. In some examples, the method may be performed by the wireless communication device 900, as described above and illustrated in FIG. 9, by a processor or processing system, or by any suitable means for carrying out the described functions.

At block 1002, the first wireless communication device may establish a first sidelink between the first wireless communication device and a second wireless communication device over a first frequency band (FR1) including a first carrier frequency. In some examples, the FR1 may correspond to a sub-6 GHz frequency band. For example, the sidelink establishment circuitry 942, shown and described above in connection with FIG. 9 may establish the first (FR1) sidelink.

At block 1004, the first wireless communication device may establish, at least in part utilizing the first sidelink, a second sidelink between the first wireless communication device and the second wireless communication device over a second frequency band (FR2) including a second carrier frequency. In some examples, the FR2 may correspond to a mmWave frequency band. In addition, the second (FR2) sidelink may be established utilizing the FR1 sidelink based on, for example, a V2X NSA deployment. In some examples, the FR2 sidelink may include two or more FR2 bands (e.g., multiple FR2 component carriers). For example, the sidelink establishment circuitry 942 shown and described above in connection with FIG. 9 may establish the second (FR2) sidelink.

At block 1006, the first wireless communication device may transmit SCI on the first (FR1) sidelink. The SCI may be associated with data to be transmitted to the second wireless communication device on the second (FR2) sidelink. In some examples, the SCI may be transmitted within a PSCCH. The PSCCH may be transmitted via an omni-directional beam. In some examples, the SCI may include resource information that may be translated from sidelink parameters (e.g., an SCS and BWP) of the FR1 to sidelink parameters (e.g., an SCS and BWP) of the FR2. For example, the SCI may include the translated resource information or may include the original resource information generated based on the FR1 sidelink parameters. In the latter case, the second wireless communication device may translate the resource information. In some examples, the PSCCH may further be scheduled based on a timing offset between the FR1 sidelink and the FR2 sidelink. In addition, the SCI may include resource information for the PSSCH scheduled based on the timing offset. For example, the resource assignment and scheduling circuitry 943, together with the communication and processing circuitry 941 and transceiver 910, shown and described above in connection with FIG. 9 may generate and transmit the SCI on the first (FR1) sidelink to the second wireless communication device.

At block 1008, the first wireless communication device may transmit the data to the second wireless communication device on the second (FR2) sidelink. In some examples, the data may be transmitted within a PSSCH. The PSSCH may be transmitted via a directional beam (e.g., a BPL) towards the second wireless communication device. For example, the resource assignment and scheduling circuitry 943, together with the communication and processing circuitry 941 and transceiver 910, may transmit the data on the second (FR2) sidelink to the second wireless communication device.

Figure 11:
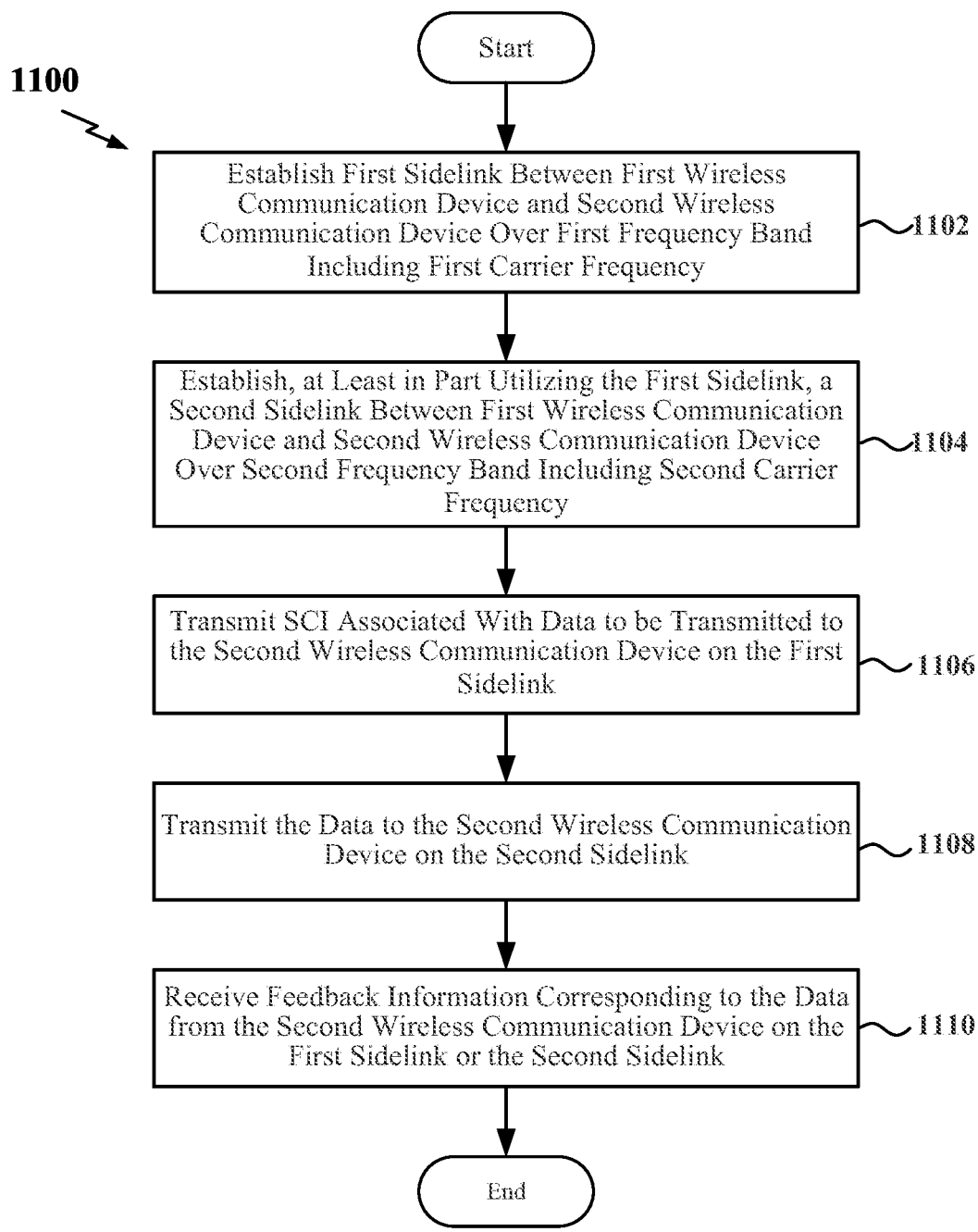
FIG. 11 is a flow chart of another exemplary method of wireless communication at a transmitting wireless communication device.

FIG. 11 is a flow chart 1100 of another method for wireless communication at a first wireless communication device (e.g., transmitting sidelink device). As described below, some or all illustrated features may be omitted in a particular implementation within the scope of the present disclosure, and some illustrated features may not be required for implementation of all embodiments. In some examples, the method may be performed by the wireless communication device 900, as described above and illustrated in FIG. 9, by a processor or processing system, or by any suitable means for carrying out the described functions.

At block 1102, the first wireless communication device may establish a first sidelink between the first wireless communication device and a second wireless communication device over a first frequency band (FR1) including a first carrier frequency. In some examples, the FR1 may correspond to a sub-6 GHz frequency band. For example, the sidelink establishment circuitry 942, shown and described above in connection with FIG. 9 may establish the first (FR1) sidelink.

At block 1104, the first wireless communication device may establish, at least in part utilizing the first sidelink, a second sidelink between the first wireless communication device and the second wireless communication device over a second frequency band (FR2) including a second carrier frequency. In some examples, the FR2 may correspond to a mmWave frequency band. In addition, the second (FR2) sidelink may be established utilizing the FR1 sidelink based on, for example, a V2X NSA deployment. For example, the sidelink establishment circuitry 942 shown and described above in connection with FIG. 9 may establish the second (FR2) sidelink.

At block 1106, the first wireless communication device may transmit a SCI on the first (FR1) sidelink. The SCI may be associated with data to be transmitted to the second wireless communication device on the second (FR2) sidelink. In some examples, the SCI may be transmitted within a PSCCH. The PSCCH may be transmitted via an omni-directional beam. In some examples, the SCI may include resource information that may be translated from sidelink parameters (e.g., an SCS and BWP) of the FR1 to sidelink parameters (e.g., an SCS and BWP) of the FR2. For example, the SCI may include the translated resource information or may include the original resource information generated based on the FR1 sidelink parameters. In the latter case, the second wireless communication device may translate the resource information. In some examples, the PSCCH may further be scheduled based on a timing offset between the FR1 sidelink and the FR2 sidelink. In addition, the SCI may include resource information for the PSSCH scheduled based on the timing offset. For example, the resource assignment and scheduling circuitry 943, together with the communication and processing circuitry 941 and transceiver 910, shown and described above in connection with FIG. 9 may generate and transmit the SCI on the first (FR1) sidelink to the second wireless communication device.

At block 1108, the first wireless communication device may transmit the data to the second wireless communication device on the second (FR2) sidelink. In some examples, the data may be transmitted within a PSSCH. The PSSCH may be transmitted via a directional beam (e.g., a BPL) towards the second wireless communication device. For example, the resource assignment and scheduling circuitry 943, together with the communication and processing circuitry 941 and transceiver 910, may transmit the data on the second (FR2) sidelink to the second wireless communication device.

At block 1110, the first wireless communication device may receive feedback information corresponding to the data from the second wireless communication device on the first sidelink or the second sidelink. The feedback information may be transmitted within a physical sidelink feedback channel (PSFCH). For example, the communication and processing circuitry 941, together with the transceiver 910, shown and described above in connection with FIG. 9 may receive the feedback information.

Figure 12:
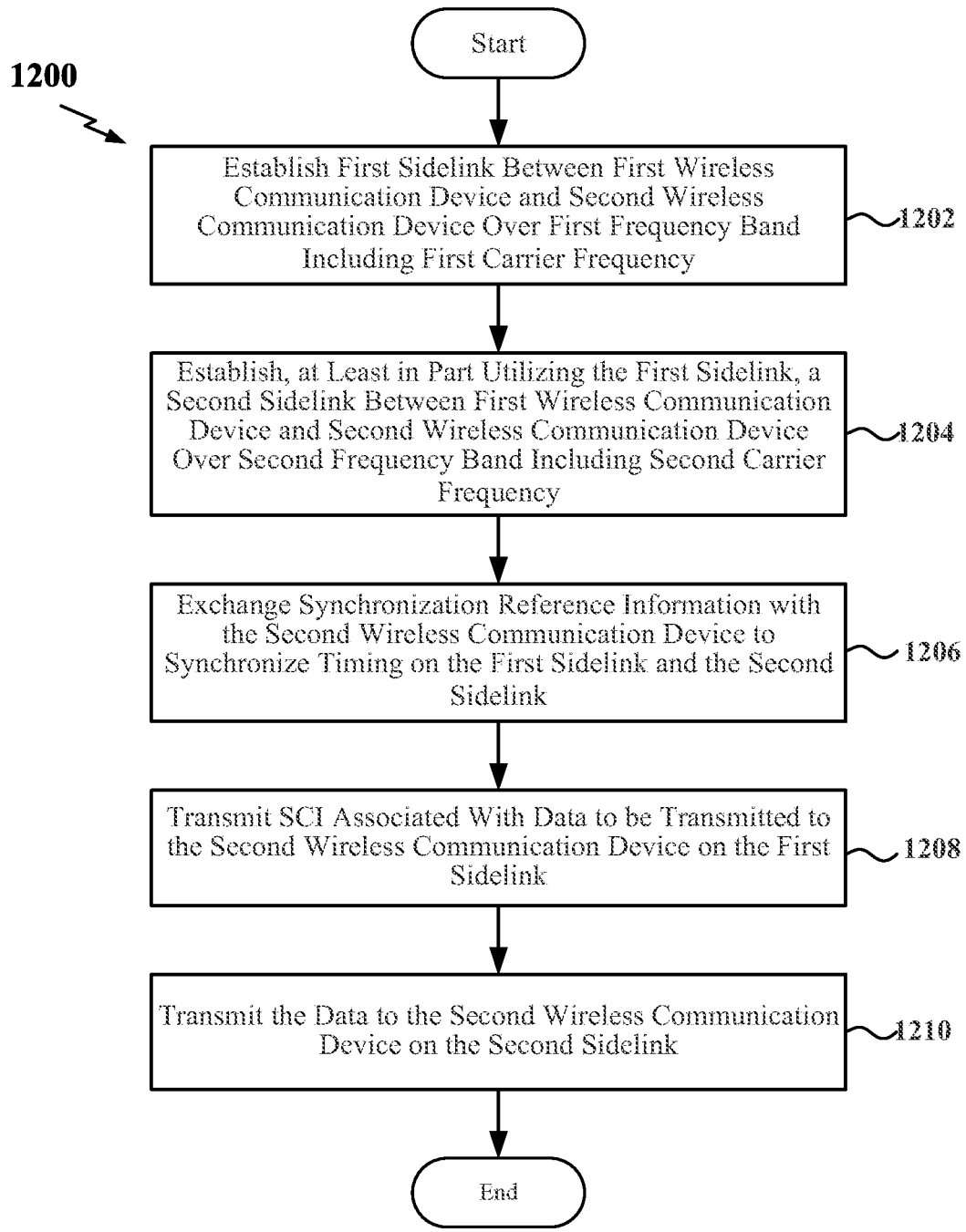
FIG. 12 is a flow chart of another exemplary method of wireless communication at a transmitting wireless communication device.

FIG. 12 is a flow chart 1200 of another method for wireless communication at a first wireless communication device (e.g., transmitting sidelink device). As described below, some or all illustrated features may be omitted in a particular implementation within the scope of the present disclosure, and some illustrated features may not be required for implementation of all embodiments. In some examples, the method may be performed by the wireless communication device 900, as described above and illustrated in FIG. 9, by a processor or processing system, or by any suitable means for carrying out the described functions.

At block 1202, the first wireless communication device may establish a first sidelink between the first wireless communication device and a second wireless communication device over a first frequency band (FR1) including a first carrier frequency. In some examples, the FR1 may correspond to a sub-6 GHz frequency band. For example, the sidelink establishment circuitry 942, shown and described above in connection with FIG. 9 may establish the first (FR1) sidelink.

At block 1204, the first wireless communication device may establish, at least in part utilizing the first sidelink, a second sidelink between the first wireless communication device and the second wireless communication device over a second frequency band (FR2) including a second carrier frequency. In some examples, the FR2 may correspond to a mmWave frequency band. In addition, the second (FR2) sidelink may be established utilizing the FR1 sidelink based on, for example, a V2X NSA deployment. For example, the sidelink establishment circuitry 942 shown and described above in connection with FIG. 9 may establish the second (FR2) sidelink.

At block 1206, the first wireless communication device may exchange synchronization reference information with the second wireless communication device to synchronize timing on the first (FR1) sidelink and the second (FR2) sidelink. The synchronization reference information can indicate at least a timing offset between a first plurality of slots communicated on the first sidelink and a second plurality of slots communicated on the second sidelink. In some examples, the numerology (e.g., subcarrier spacing (SCS)) between FR1 and FR2 is different. As a result, the slot duration and number of RBs per slot is different in the first plurality of slots and the second plurality of slots. In some examples, the synchronization reference information may include an S-SS or S-SSB for both FR1 and FR2 exchanged at the time of the NSA call set-up procedure in FR1 for FR2. For example, the sidelink synchronization circuitry 944, together with the communication and processing circuitry 941 and transceiver 910, may exchange synchronization reference information.

At block 1208, the first wireless communication device may transmit SCI on the first (FR1) sidelink. The SCI may be associated with data to be transmitted to the second wireless communication device on the second (FR2) sidelink. In some examples, the SCI may be transmitted within a PSCCH. The PSCCH may be transmitted via an omnidirectional beam. In some examples, the SCI may include resource information that may be translated from sidelink parameters (e.g., an SCS and BWP) of the FR1 to sidelink parameters (e.g., an SCS and BWP) of the FR2. For example, the SCI may include the translated resource information or may include the original resource information generated based on the FR1 sidelink parameters. In the latter case, the second wireless communication device may translate the resource information. In some examples, the PSCCH may further be scheduled based on the timing offset between the FR1 sidelink and the FR2 sidelink. In addition, the SCI may include resource information for the PSSCH scheduled based on the timing offset. For example, the resource assignment and scheduling circuitry 943, together with the communication and processing circuitry 941 and transceiver 910, shown and described above in connection with FIG. 9 may generate and transmit the SCI on the first (FR1) sidelink to the second wireless communication device.

At block 1210, the first wireless communication device may transmit the data to the second wireless communication device on the second (FR2) sidelink. In some examples, the data may be transmitted within a PSSCH. In some examples, the PSSCH may be transmitted via a directional beam (e.g., a BPL) towards the second wireless communication device. For example, the resource assignment and scheduling circuitry 943, together with the communication and processing circuitry 941 and transceiver 910, may transmit the data on the second (FR2) sidelink to the second wireless communication device.

Figure 13:
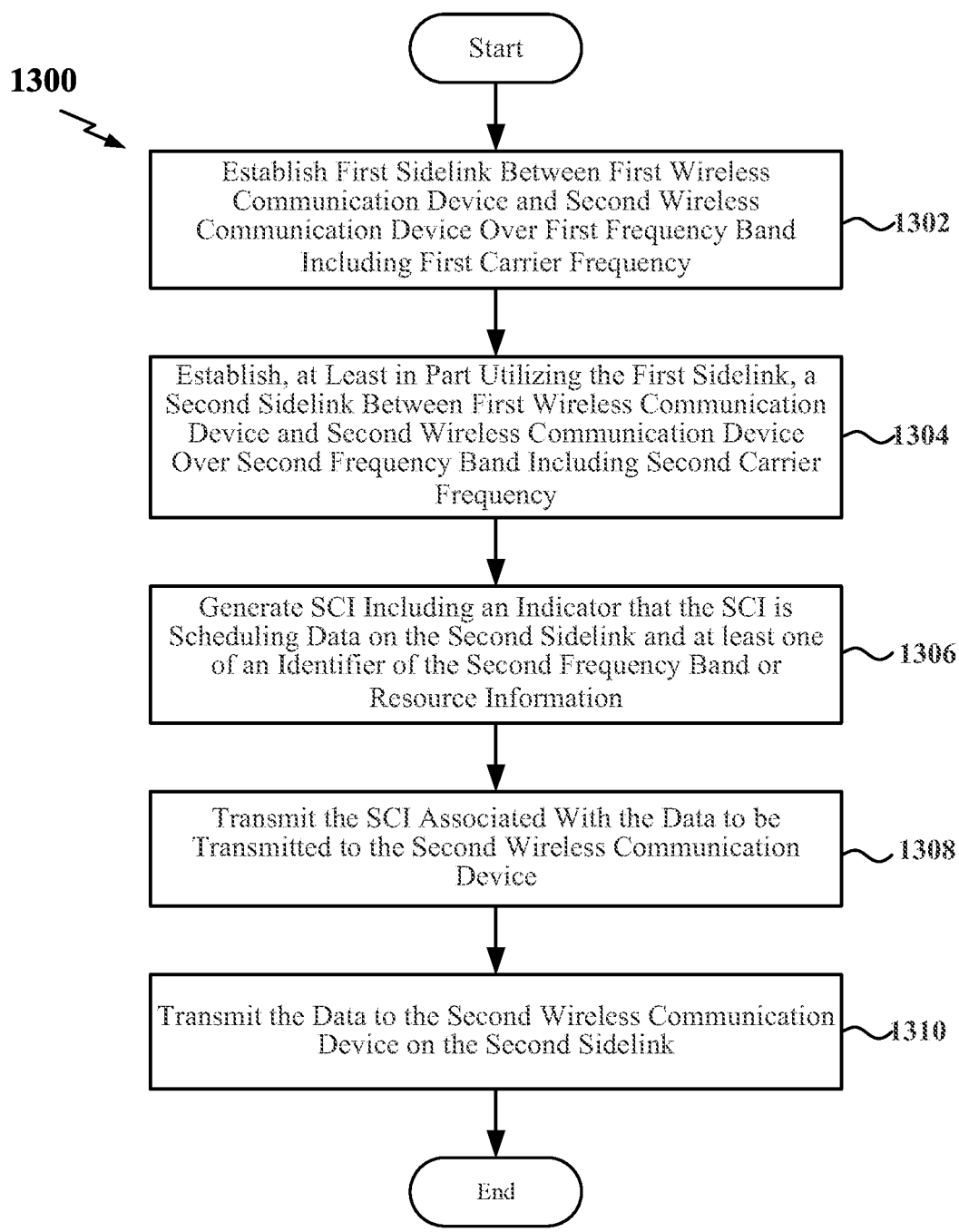
FIG. 13 is a flow chart of another exemplary method of wireless communication at a transmitting wireless communication device.

FIG. 13 is a flow chart 1300 of another method for wireless communication at a first wireless communication device (e.g., transmitting sidelink device). As described below, some or all illustrated features may be omitted in a particular implementation within the scope of the present disclosure, and some illustrated features may not be required for implementation of all embodiments. In some examples, the method may be performed by the wireless communication device 900, as described above and illustrated in FIG. 9, by a processor or processing system, or by any suitable means for carrying out the described functions.

At block 1302, the first wireless communication device may establish a first sidelink between the first wireless communication device and a second wireless communication device over a first frequency band (FR1) including a first carrier frequency. In some examples, the FR1 may correspond to a sub-6 GHz frequency band. For example, the sidelink establishment circuitry 942, shown and described above in connection with FIG. 9 may establish the first (FR1) sidelink.

At block 1304, the first wireless communication device may establish, at least in part utilizing the first sidelink, a second sidelink between the first wireless communication device and the second wireless communication device over a second frequency band (FR2) including a second carrier frequency. In some examples, the FR2 may correspond to a mmWave frequency band. In addition, the second (FR2) sidelink may be established utilizing the FR1 sidelink based on, for example, a V2X NSA deployment. For example, the sidelink establishment circuitry 942 shown and described above in connection with FIG. 9 may establish the second (FR2) sidelink.

At block 1306, the first wireless communication device may generate sidelink control information (SCI) including an indicator that the SCI is scheduling data (e.g., a PSSCH including the data) on the second sidelink. The SCI can further include at least one of an identifier of the second frequency band (FR2) or resource information indicating resource on which the data is to be transmitted. In some examples, the resource information for the second sidelink can be generated based on at least one of first sidelink parameters associated with the first sidelink or second sidelink parameters associated with the second sidelink. For example, the first sidelink parameters can include a first subcarrier spacing and a first bandwidth part associated with the first sidelink and the second sidelink parameters can include a second subcarrier spacing and a second bandwidth part associated with the second sidelink. Thus, the resource information included in the SCI may include original resource information generated based on the FR1 sidelink parameters or translated resource information translated from the FR1 sidelink parameters to the FR2 sidelink parameters. In the former case, the second wireless communication device may translate the resource information. For example, the resource assignment and scheduling circuitry 943, together with the resource translation circuitry 945, may generate the SCI.

At block 1308, the first wireless communication device may transmit the SCI on the first (FR1) sidelink. In some examples, the SCI may be transmitted within a PSCCH. In some examples, the PSCCH may be transmitted via an omni-directional beam. In some examples, the PSCCH may further be scheduled based on the timing offset between the FR1 sidelink and the FR2 sidelink. In addition, the SCI may include resource information for the PSSCH scheduled based on the timing offset. For example, the resource assignment and scheduling circuitry 943, together with the communication and processing circuitry 941 and transceiver 910, shown and described above in connection with FIG. 9 may generate and transmit the SCI on the first (FR1) sidelink to the second wireless communication device.

At block 1310, the first wireless communication device may transmit the data to the second wireless communication device on the second (FR2) sidelink. In some examples, the data may be transmitted within the PSSCH. In some examples, the PSSCH may be transmitted via a directional beam (e.g., a BPL) towards the second wireless communication device. For example, the resource assignment and scheduling circuitry 943, together with the communication and processing circuitry 941 and transceiver 910, may transmit the data on the second (FR2) sidelink to the second wireless communication device.

Figure 14:
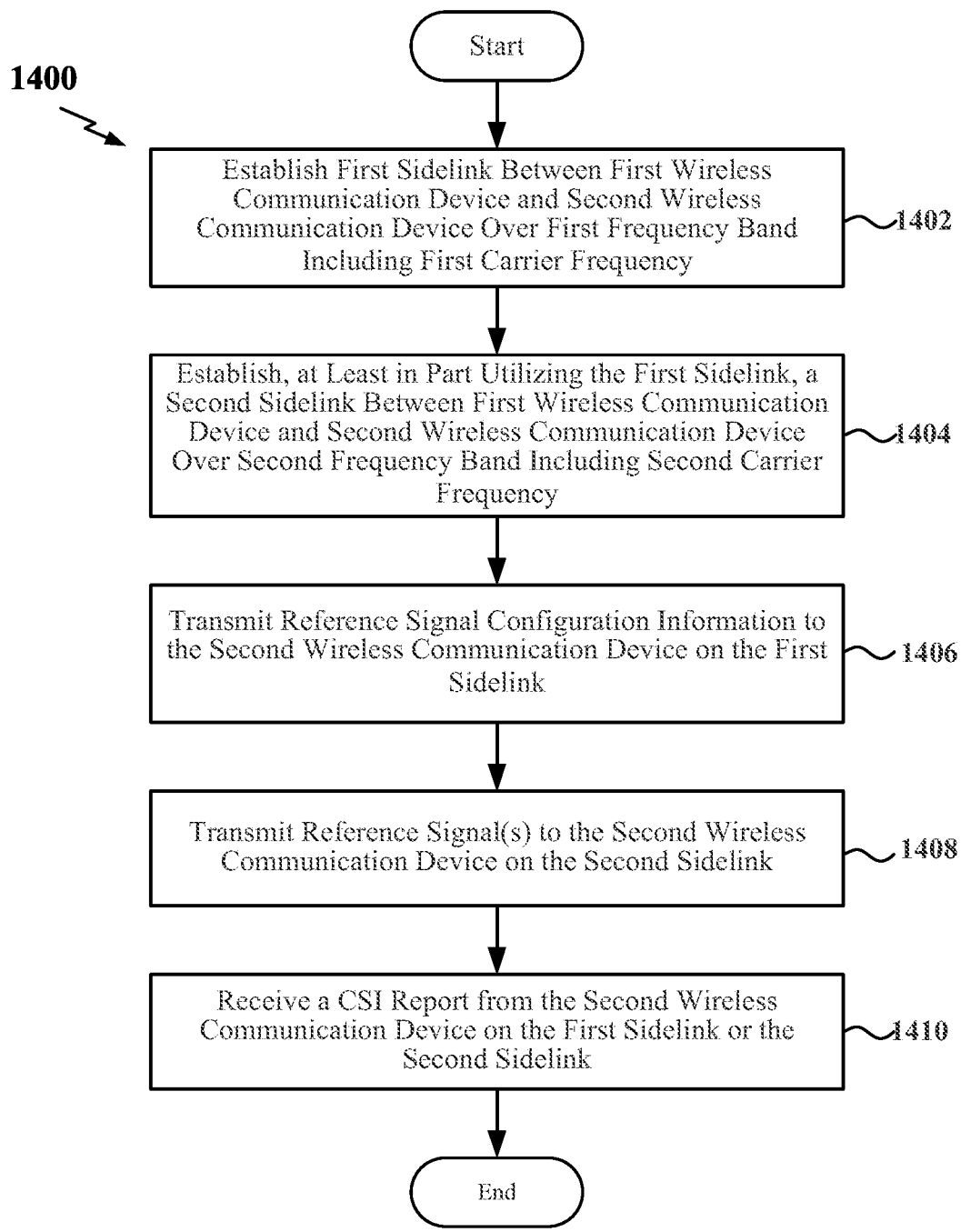
FIG. 14 is a flow chart of another exemplary method of wireless communication at a transmitting wireless communication device.

FIG. 14 is a flow chart 1400 of another method for wireless communication at a first wireless communication device (e.g., transmitting sidelink device). As described below, some or all illustrated features may be omitted in a particular implementation within the scope of the present disclosure, and some illustrated features may not be required for implementation of all embodiments. In some examples, the method may be performed by the wireless communication device 900, as described above and illustrated in FIG. 9, by a processor or processing system, or by any suitable means for carrying out the described functions.

At block 1402, the first wireless communication device may establish a first sidelink between the first wireless communication device and a second wireless communication device over a first frequency band (FR1) including a first carrier frequency. In some examples, the FR1 may correspond to a sub-6 GHz frequency band. For example, the sidelink establishment circuitry 942, shown and described above in connection with FIG. 9 may establish the first (FR1) sidelink.

At block 1404, the first wireless communication device may establish, at least in part utilizing the first sidelink, a second sidelink between the first wireless communication device and the second wireless communication device over a second frequency band (FR2) including a second carrier frequency utilizing the first sidelink. In some examples, the FR2 may correspond to a mmWave frequency band. In addition, the second (FR2) sidelink may be established utilizing the FR1 sidelink based on, for example, a V2X NSA deployment. For example, the sidelink establishment circuitry 942 shown and described above in connection with FIG. 9 may establish the second (FR2) sidelink.

At block 1406, the first wireless communication device may transmit reference signal configuration information to the second wireless communication device on the first sidelink. The reference signal configuration information may indicate a configuration of one or more reference signals to be transmitted by the first wireless communication device on the second sidelink. The reference signals may include, for example, one or more of a CSI-RS, DMRS, or other suitable reference signal or pilot. The reference signal configuration information may include resource information indicating time-frequency resources on the FR2 allocated for the transmission of the reference signals, a periodicity of the transmission of the reference signals, and CSI report information indicating the particular CSI quantities (e.g., PMI, RI, CQI, etc.) to include in a CSI report, along with an indication of whether the CSI report should be generated periodically, aperiodically, or semi-statically. The reference signal configuration information may further include respective reference signal configuration information for each FR2 component carrier when carrier aggregation is implemented on the FR2 sidelink. For example, the communication and processing circuitry 941, together with the transceiver 910, shown and described above in connection with FIG. 9 may transmit the reference signal configuration information on the FR1 sidelink.

At block 1408, the first wireless communication device may transmit the reference signals to the second wireless communication device on the second sidelink in accordance with the reference signal configuration information. For example, the communication and processing circuitry 941, together with the transceiver 910, shown and described above in connection with FIG. 9 may transmit the reference signals on the FR2 sidelink.

At block 1410, the first wireless communication device may receive a CSI report from the second wireless communication device on either the FR1 sidelink or the FR2 sidelink. In some examples, the CSI report may be received within the PSFCH on either the FR1 sidelink or the FR2 sidelink. The CSI report may include the CQI, PMI, RI, and/or other suitable parameters indicative of the FR2 sidelink channel quality. In examples in which the FR2 sidelink is implementing carrier aggregation, a respective CSI report for each FR2 component carrier may be received. The first wireless communication device may utilize the CSI report for sidelink adaptation of the FR2 sidelink. For example, the communication and processing circuitry 941, together with the transceiver 910, may receive the CSI report.

Figure 15:
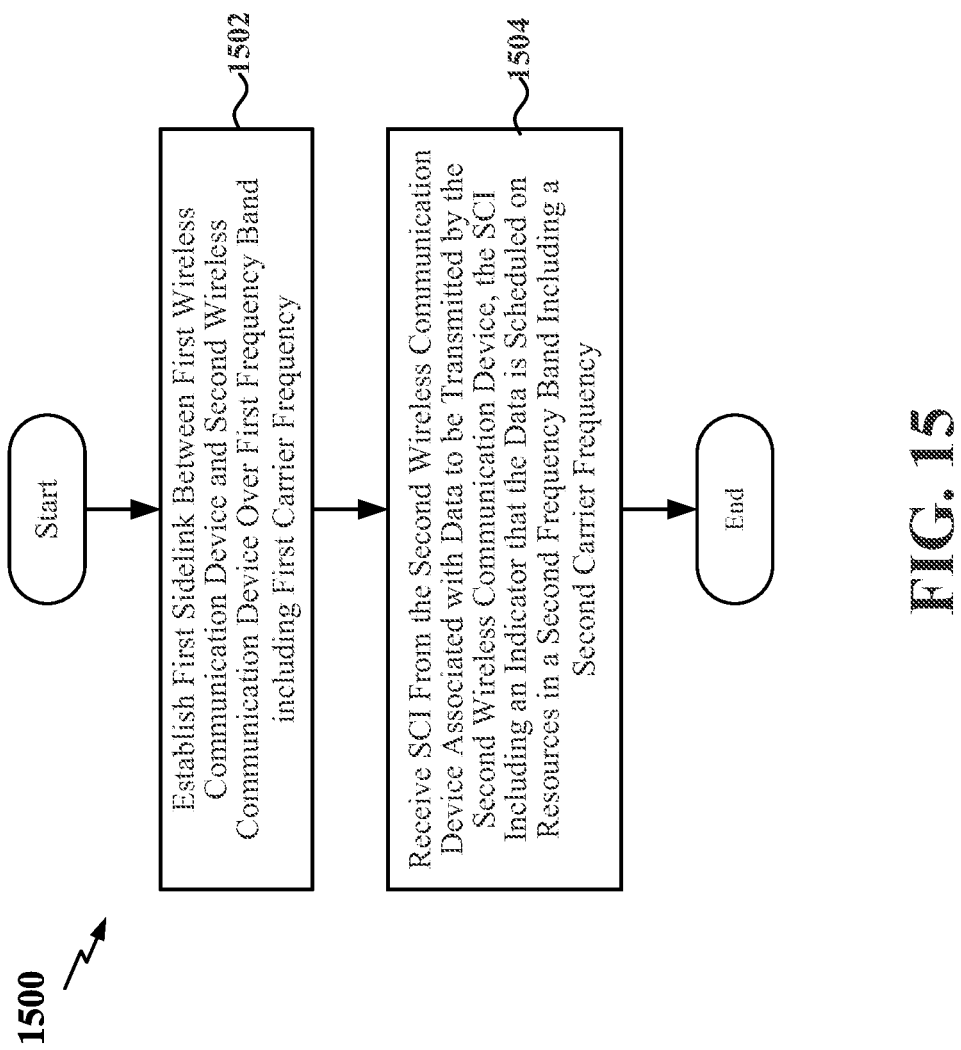
FIG. 15 is a flow chart of an exemplary method of wireless communication at a receiving wireless communication device.

FIG. 15 is a flow chart 1500 of a method for wireless communication at a first wireless communication device (e.g., a receiving sidelink device). As described below, some or all illustrated features may be omitted in a particular implementation within the scope of the present disclosure, and some illustrated features may not be required for implementation of all embodiments. In some examples, the method may be performed by the wireless communication device 900, as described above and illustrated in FIG. 9, by a processor or processing system, or by any suitable means for carrying out the described functions.

At block 1502, the first wireless communication device may establish a first sidelink between a second wireless communication device and the first wireless communication device over a first frequency band (FR1) including a first carrier frequency. In some examples, the FR1 may correspond to a sub-6 GHz frequency band. For example, the sidelink establishment circuitry 942, shown and described above in connection with FIG. 9 may establish the first (FR1) sidelink.

At block 1504, the first wireless communication device may receive SCI on the first (FR1) sidelink. The SCI may be associated with data to be transmitted (e.g., on a PSSCH) by the second wireless communication device. The SCI may include an indicator that the data is scheduled on resources in a second frequency band (FR2) including a second carrier frequency. In some examples, the FR2 may correspond to a mmWave frequency band. In some examples, the SCI may be received within a PSCCH. In some examples, the PSCCH may be received via an omni-directional beam. In some examples, the first wireless communication device may utilize the resource information included in the SCI to avoid scheduling a transmission (e.g., another PSSCH) on the same FR2 resources indicated in the SCI. In some examples, the first wireless communication device is the target wireless communication device for the PSCCH and PSSCH. In this example, the resource information included in the SCI may include time-frequency resources based on sidelink parameters (e.g., SCS and BWP) of the FR1. The first wireless communication device may then translate the resource information from the sidelink parameters (e.g., an SCS and BWP) of the FR1 to sidelink parameters (e.g., an SCS and BWP) of the FR2. For example, the communication and processing circuitry 941, together with the transceiver 910, shown and described above in connection with FIG. 9 may receive the SCI on the first (FR1) sidelink from the second wireless communication device.

Figure 16:
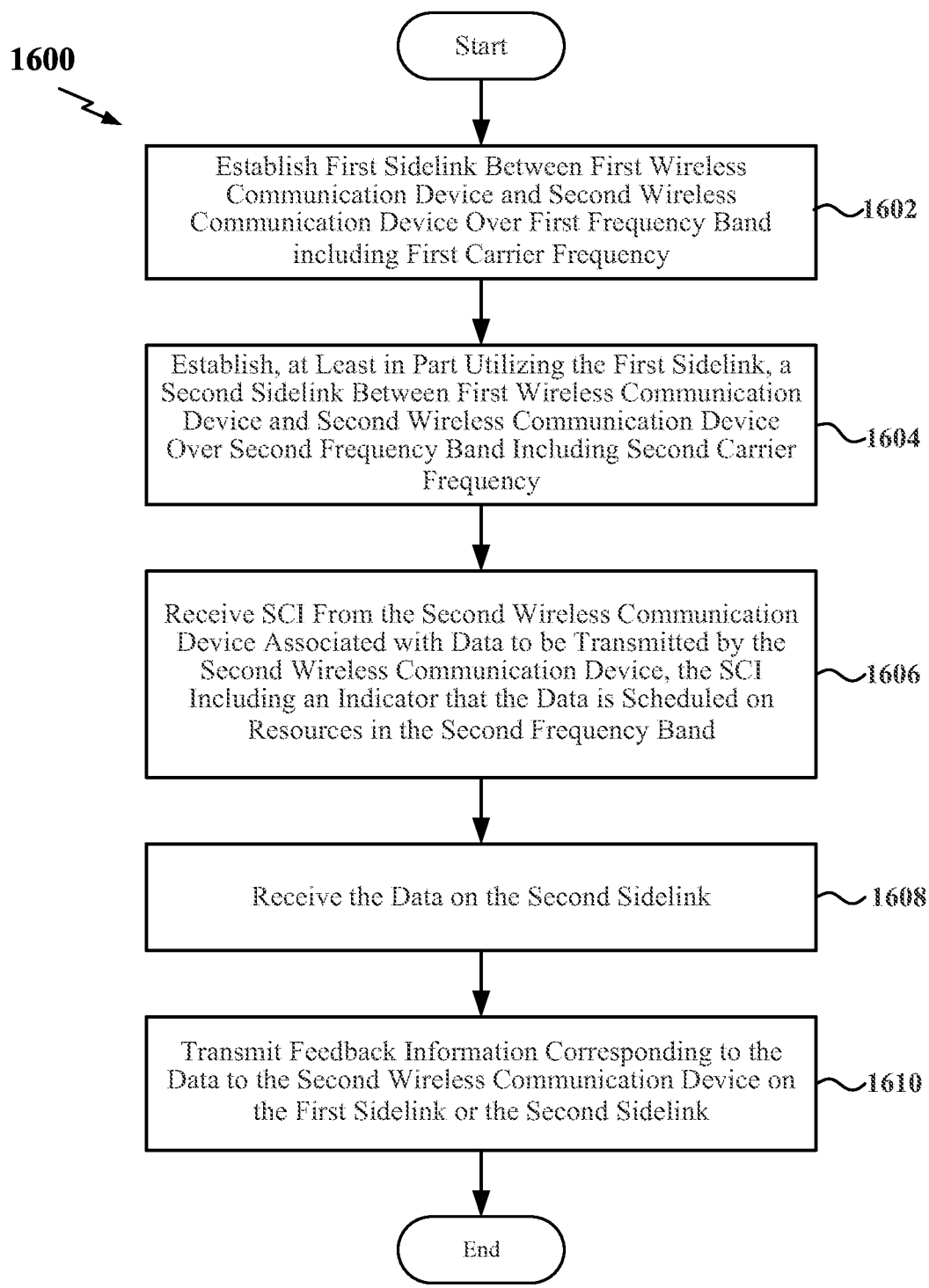
FIG. 16 is a flow chart of another exemplary method of wireless communication at a receiving wireless communication device.

FIG. 16 is a flow chart 1600 of another method for wireless communication at a first wireless communication device (e.g., a receiving sidelink device). As described below, some or all illustrated features may be omitted in a particular implementation within the scope of the present disclosure, and some illustrated features may not be required for implementation of all embodiments. In some examples, the method may be performed by the wireless communication device 900, as described above and illustrated in FIG. 9, by a processor or processing system, or by any suitable means for carrying out the described functions.

At block 1602, the first wireless communication device may establish a first sidelink between a second wireless communication device and the first wireless communication device over a first frequency band (FR1) including a first carrier frequency. In some examples, the FR1 may correspond to a sub-6 GHz frequency band. For example, the sidelink establishment circuitry 942, shown and described above in connection with FIG. 9 may establish the first (FR1) sidelink.

At 1604, the first wireless communication device may establish, at least in part utilizing the first sidelink, a second sidelink between the second wireless communication device and the first wireless communication device over a second frequency band (FR2) including a second carrier frequency. In some examples, the FR2 may correspond to a mmWave frequency band. In addition, the second (FR2) sidelink may be established utilizing the FR1 sidelink based on, for example, a V2X NSA deployment. For example, the sidelink establishment circuitry 942 shown and described above in connection with FIG. 9 may establish the second (FR2) sidelink.

At block 1606, the first wireless communication device may receive SCI on the first (FR1) sidelink. The SCI may be associated with data to be transmitted (e.g., on a PSSCH) by the second wireless communication device. The SCI may include an indicator that the data is scheduled on resources in the second frequency band (FR2) on the second (FR2) sidelink. In some examples, the SCI may be received within a PSCCH. In some examples, the PSCCH may be received via an omni-directional beam. In some examples, the first wireless communication device may utilize the resource information included in the SCI to avoid scheduling a transmission (e.g., another PSSCH) on the same FR2 resources indicated in the SCI. In some examples, the first wireless communication device is the target wireless communication device for the PSCCH and PSSCH. In this example, the resource information included in the SCI may include time-frequency resources based on sidelink parameters (e.g., SCS and BWP) of the FR1. The first wireless communication device may then translate the resource information from the sidelink parameters (e.g., an SCS and BWP) of the FR1 to sidelink parameters (e.g., an SCS and BWP) of the FR2. For example, the communication and processing circuitry 941, together with the transceiver 910, shown and described above in connection with FIG. 9 may receive the SCI on the first (FR1) sidelink from the second wireless communication device.

At block 1608, the first wireless communication device may receive the data (e.g., within the PSSCH) on the second sidelink from the second wireless communication device. In some examples, the PSSCH may be received via a directional beam (e.g., a BPL) from the second wireless communication device. For example, the communication and processing circuitry 941, together with the transceiver 910, may receive the data on the second (FR2) sidelink from the second wireless communication device.

At block 1610, the first wireless communication device may transmit feedback information corresponding to the data to the second wireless communication device on the first sidelink or the second sidelink. In some examples, the feedback information may be transmitted within a physical sidelink feedback channel (PSFCH). For example, the communication and processing circuitry 941, together with the transceiver 910, shown and described above in connection with FIG. 9 may transmit the feedback information.

Figure 17:
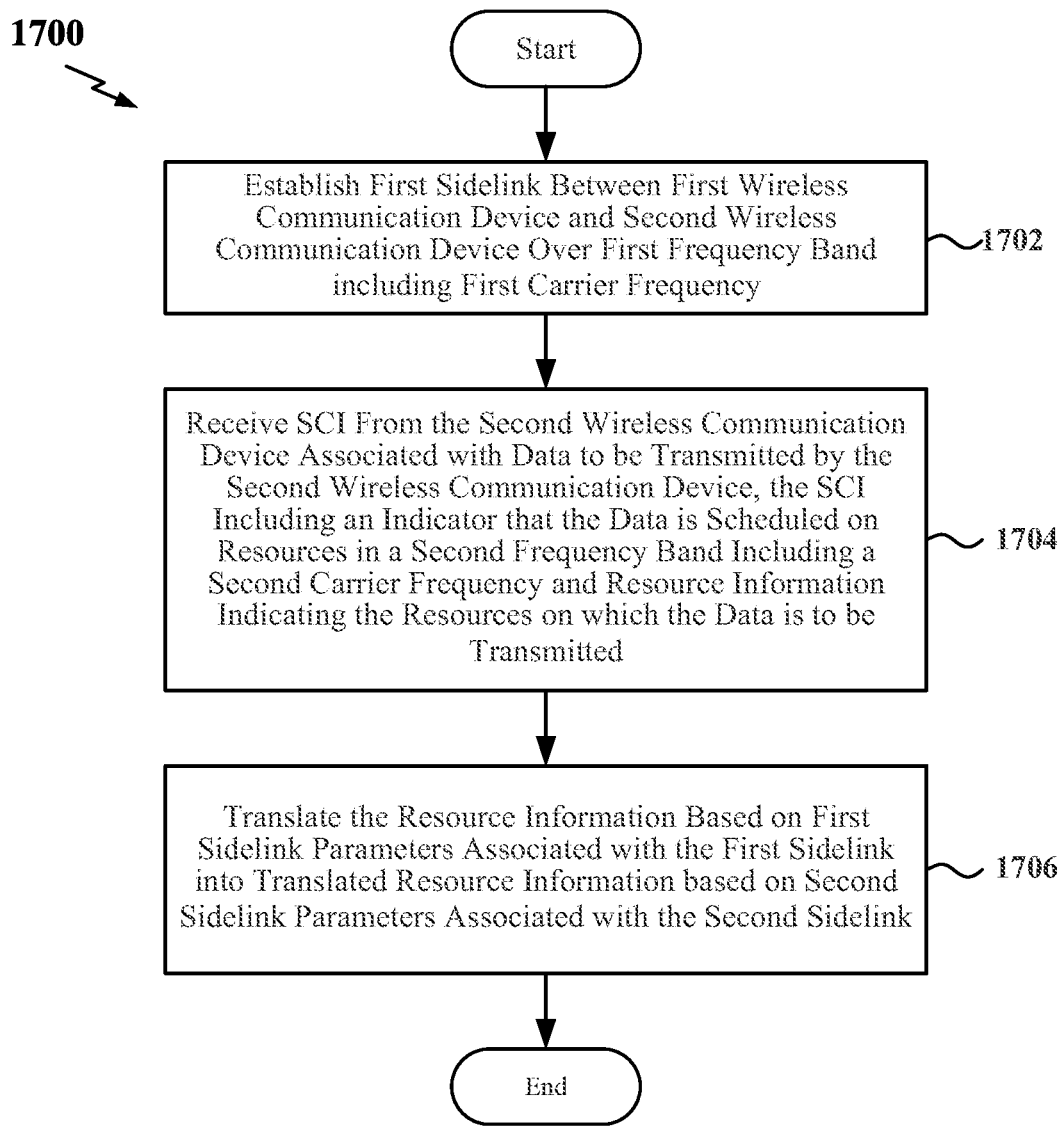
FIG. 17 is a flow chart of another exemplary method of wireless communication at a receiving wireless communication device.

FIG. 17 is a flow chart 1700 of a method for wireless communication at a first wireless communication device (e.g., a receiving sidelink device). As described below, some or all illustrated features may be omitted in a particular implementation within the scope of the present disclosure, and some illustrated features may not be required for implementation of all embodiments. In some examples, the method may be performed by the wireless communication device 900, as described above and illustrated in FIG. 9, by a processor or processing system, or by any suitable means for carrying out the described functions.

At block 1702, the first wireless communication device may establish a first sidelink between a second wireless communication device and the first wireless communication device over a first frequency band (FR1) including a first carrier frequency. In some examples, the FR1 may correspond to a sub-6 GHz frequency band. For example, the sidelink establishment circuitry 942, shown and described above in connection with FIG. 9 may establish the first (FR1) sidelink.

At block 1704, the first wireless communication device may receive SCI on the first (FR1) sidelink. The SCI may be associated with data to be transmitted (e.g., on a PSSCH) by the second wireless communication device. The SCI may include an indicator that the data is scheduled on resources in a second frequency band (FR2) including a second carrier frequency. The SCI may further include resource information indicating the resources on which the data is to be transmitted. In some examples, the FR2 may correspond to a mmWave frequency band. In some examples, the SCI may be received within a PSCCH. In some examples, the PSCCH may be received via an omni-directional beam. In some examples, the first wireless communication device may utilize the resource information included in the SCI to avoid scheduling a transmission (e.g., another PSSCH) on the same FR2 resources indicated in the SC. For example, the communication and processing circuitry 941, together with the transceiver 910, shown and described above in connection with FIG. 9 may receive the SCI on the first (FR1) sidelink from the second wireless communication device.

At block 1706, the resource information included in the SCI may include time-frequency resources based on sidelink parameters (e.g., SCS and BWP) of the FR1. As such, the first wireless communication device may translate the resource information based on the FR1 sidelink parameter associated with the first sidelink into translated resource information based on FR2 sidelink parameters (e.g., an SCS and BWP of FR2) associated with the second sidelink. For example, the resource translation circuitry 945, shown and described above in connection with FIG. 9 may translate the resource information.

Figure 18:
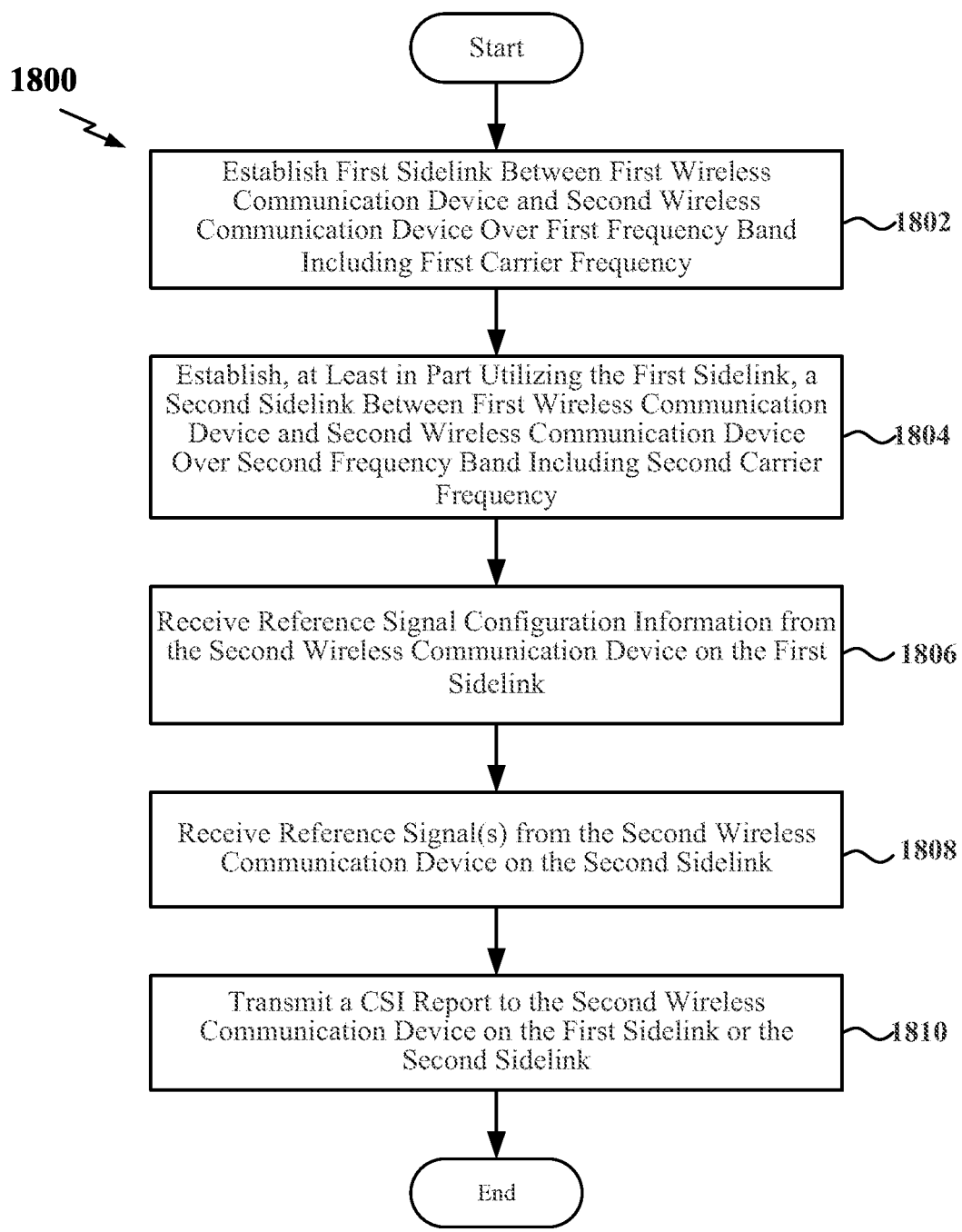
FIG. 18 is a flow chart of another exemplary method of wireless communication at a receiving wireless communication device.

FIG. 18 is a flow chart 1800 of another method for wireless communication at a first wireless communication device (e.g., receiving sidelink device). As described below, some or all illustrated features may be omitted in a particular implementation within the scope of the present disclosure, and some illustrated features may not be required for implementation of all embodiments. In some examples, the method may be performed by the wireless communication device 900, as described above and illustrated in FIG. 9, by a processor or processing system, or by any suitable means for carrying out the described functions.

At block 1802, the first wireless communication device may establish a first sidelink between the first wireless communication device and a second wireless communication device over a first frequency band (FR1) including a first carrier frequency. In some examples, the FR1 may correspond to a sub-6 GHz frequency band. For example, the sidelink establishment circuitry 942, shown and described above in connection with FIG. 9 may establish the first (FR1) sidelink.

At block 1804, the first wireless communication device may establish, at least in part utilizing the first sidelink, a second sidelink between the first wireless communication device and the second wireless communication device over a second frequency band (FR2) including a second carrier frequency. In some examples, the FR2 may correspond to a mmWave frequency band. In addition, the second (FR2) sidelink may be established utilizing the FR1 sidelink based on, for example, a V2X NSA deployment. For example, the sidelink establishment circuitry 942 shown and described above in connection with FIG. 9 may establish the second (FR2) sidelink.

At block 1806, the first wireless communication device may receive reference signal configuration information from the second wireless communication device on the first sidelink. The reference signal configuration information may indicate a configuration of one or more reference signals to be transmitted by the second wireless communication device on the second sidelink. The reference signals may include, for example, one or more of a CSI-RS, DMRS, or other suitable reference signal or pilot. The reference signal configuration information may include resource information indicating time-frequency resources on the FR2 allocated for the transmission of the reference signals, a periodicity of the transmission of the reference signals, and CSI report information indicating the particular CSI quantities (e.g., PMI, RI, CQI, etc.) to include in a CSI report, along with an indication of whether the CSI report should be generated periodically, aperiodically, or semi-statically. The reference signal configuration information may further include respective reference signal configuration information for each FR2 component carrier when carrier aggregation is implemented on the FR2 sidelink. For example, the communication and processing circuitry 941, together with the transceiver 910, shown and described above in connection with FIG. 9 may receive the reference signal configuration information on the FR1 sidelink.

At block 1808, the first wireless communication device may receive the reference signals from the second wireless communication device on the second sidelink in accordance with the reference signal configuration information. The first wireless communication device may then measure the channel quality of the second sidelink using the reference signals and generate channel state feedback information (e.g., CQI, PMI, RI, etc.) based on the measured channel quality. For example, the communication and processing circuitry 941, together with the transceiver 910, shown and described above in connection with FIG. 9 may receive the reference signals on the FR2 sidelink.

At block 1810, the first wireless communication device may transmit a CSI report to the second wireless communication device on either the FR1 sidelink or the FR2 sidelink. In some examples, the CSI report may be transmitted within the PSFCH on either the FR1 sidelink or the FR2 sidelink. The CSI report may include the CQI, PMI, RI, and/or other suitable parameters indicative of the FR2 sidelink channel quality. In examples in which the FR2 sidelink is implementing carrier aggregation, a respective CSI report for each FR2 component carrier may be transmitted. For example, the communication and processing circuitry 941, together with the transceiver 910, may transmit the CSI report.

In one configuration, a first wireless communication device (e.g., a transmitting sidelink device) includes means for establishing a first sidelink with a second wireless communication device on a first frequency band including a first carrier frequency, means for establishing a second sidelink with the second wireless communication device on a second frequency band including a second carrier frequency utilizing the first sidelink, and means for transmitting sidelink control information (SCI) associated with data to be transmitted from the first wireless communication device to the second wireless communication device on the first sidelink. The wireless communication device further includes means for transmitting the data to the second wireless communication device on the second sidelink.

In one aspect, the aforementioned means for establishing the first sidelink, means for establishing the second sidelink, means for transmitting the SCI on the first sidelink, and means for transmitting the data on the second sidelink may be the processor(s) 904 shown in FIG. 9 configured to perform the functions recited by the aforementioned means. For example, the aforementioned means for establishing the first sidelink and the means for establishing the second sidelink may include the sidelink establishment circuitry 942 and transceiver 910 shown in FIG. 9. As another example, the aforementioned means for transmitting the SCI on the first sidelink and the means for transmitting the data on the second sidelink may include the resource assignment and scheduling circuitry 943, communication and processing circuitry 941, and transceiver shown in FIG. 10. In another aspect, the aforementioned means may be a circuit or any apparatus configured to perform the functions recited by the aforementioned means.

In another configuration, a first wireless communication device (e.g., a receiving sidelink device) may include means for establishing a first sidelink with a second wireless communication device on a first frequency band including a first carrier frequency, and means for receiving sidelink control information (SCI) associated with data to be transmitted by the second wireless communication device on the first sidelink. The SCI includes an indicator that the SCI is scheduling the data on resources within a second frequency band including a second carrier frequency.

In one aspect, the aforementioned means for establishing the first sidelink and means for receiving the SCI on the first sidelink may be the processor(s) 904 shown in FIG. 9 configured to perform the functions recited by the aforementioned means. For example, the aforementioned means for establishing the first sidelink may include the sidelink establishment circuitry 942 shown in FIG. 9. As another example, the aforementioned means for receiving the SCI may include the communication and processing circuitry 941 and transceiver 910 shown in FIG. 9. In another aspect, the aforementioned means may be a circuit or any apparatus configured to perform the functions recited by the aforementioned means.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-18 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 4-6, and/or 9 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication at a first wireless communication device, the method comprising:
   establishing a first sidelink with a second wireless communication device on a first frequency band comprising a first carrier frequency;
   establishing, at least in part utilizing the first sidelink, a second sidelink with the second wireless communication device on a second frequency band comprising a second carrier frequency;
   exchanging synchronization reference information with the second wireless communication device to synchronize timing on the first sidelink and the second sidelink, wherein the exchanged synchronization reference information indicates any timing offset between respective slot boundaries of the first and second sidelinks;

transmitting sidelink control information (SCI) based on the timing offset on the first sidelink, the SCI comprising an indicator that the SCI is scheduling data to be transmitted from the first wireless communication device to the second wireless communication device on the second sidelink; and transmitting the data to the second wireless communication device on the second sidelink.

2. The method of claim 1, further comprising:
receiving feedback information corresponding to the data from the second wireless communication device on the first sidelink or the second sidelink.

3. The method of claim 1, further comprising:
aligning respective slot boundaries of the first and second sidelinks based on the timing offset.

4. The method of claim 1, further comprising:
scheduling the SCI and the data based on the timing offset.

5. The method of claim 1, further comprising:
generating the SCI comprising at least one of an identifier of the second frequency band on which the data is to be transmitted or resource information indicating resources on which the data is to be transmitted.

6. The method of claim 5, further comprising:
generating the resource information for the second sidelink based on at least one of first sidelink parameters associated with the first sidelink or second sidelink parameters associated with the second sidelink.

7. The method of claim 6, wherein the first sidelink parameters comprise a first subcarrier spacing and a first bandwidth part associated with the first sidelink and the second sidelink parameters comprise a second subcarrier spacing and a second bandwidth part associated with the second sidelink.

8. The method of claim 1, further comprising:
communicating with the second wireless communication device on the first frequency band utilizing an omnidirectional beam; and
communicating with the second wireless communication device on the second frequency band utilizing at least one directional beam.

9. The method of claim 1, wherein the first frequency band comprises a sub 5 gigahertz frequency band and the second frequency band comprises a millimeter wave frequency band.

10. The method of claim 1, wherein establishing the second sidelink with the second wireless communication device further comprises:
aggregating the second carrier frequency and at least a third carrier frequency within the second frequency band to form the second sidelink.

11. The method of claim 1, further comprising:
transmitting reference signal configuration information to the second wireless communication device on the first sidelink, wherein the reference signal configuration information indicates a configuration of one or more reference signals to be transmitted on the second sidelink;
transmitting the one or more reference signals on the second sidelink; and
receiving a channel state information (CSI) report generated based on the one or more reference signals from the second wireless communication device on the first sidelink or the second sidelink.

12. The method of claim 1, further comprising:
establishing a third sidelink with a third wireless communication device on a third carrier frequency within the second frequency band.

13. The method of claim 1, wherein the SCI further comprises synchronization information.

14. A first wireless communication device, comprising:
a processor;
a wireless transceiver communicatively coupled to the processor; and
a memory communicatively coupled to the processor, wherein the processor and the memory are configured to:
establish a first sidelink with a second wireless communication device on a first frequency band comprising a first carrier frequency via the wireless transceiver;
establish, at least in part utilizing the first sidelink, a second sidelink with the second wireless communication device on a second frequency band comprising a second carrier frequency via the wireless transceiver;
exchange synchronization reference information with the second wireless communication device to synchronize timing on the first sidelink and the second sidelink, wherein the exchanged synchronization reference information indicates any timing offset between respective slot boundaries of the first and second sidelinks;
transmit sidelink control information (SCI) based on the timing offset on the first sidelink, the SCI comprising an indicator that the SCI is scheduling data to be transmitted from the first wireless communication device to the second wireless communication device on the second sidelink; and
transmit the data to the second wireless communication device on the second sidelink via the wireless transceiver.

15. The first wireless communication device of claim 14, wherein the processor and the memory are further configured to:
receive feedback information corresponding to the data via the wireless transceiver from the second wireless communication device on the first sidelink or the second sidelink.

16. The first wireless communication device of claim 14, wherein the processor and the memory are further configured to:
generate the SCI comprising at least one of an identifier of the second frequency band on which the data is to be transmitted or resource information indicating resources on which the data is to be transmitted.

17. The first wireless communication device of claim 16, wherein the processor and the memory are further configured to:
generate the resource information for the second sidelink based on at least one of first sidelink parameters associated with the first sidelink or second sidelink parameters associated with the second sidelink.

18. A method for wireless communication at a first wireless communication device, the method comprising:
establishing a first sidelink with a second wireless communication device on a first frequency band comprising a first carrier frequency exchanging synchronization reference information with the second wireless communication device to synchronize timing on the first sidelink and a second sidelink, wherein the exchanged synchronization reference information indicates any timing offset between respective slot boundaries of the first and second sidelinks;

receiving sidelink control information (SCI) on the first sidelink, the SCI comprising an indicator that the SCI is scheduling data to be transmitted by the second wireless communication device on resources for the second sidelink within a second frequency band comprising a second carrier frequency.

19. The method of claim 18, further comprising:
avoiding scheduling a transmission on the resources within the second frequency band based on the SCI.

20. The method of claim 18, further comprising:
establishing, at least in part utilizing the first sidelink, the second sidelink with the second wireless communication device on the second frequency band;
receiving the data on the second sidelink from the second wireless communication device; and
transmitting feedback information corresponding to the data to the second wireless communication device on the first sidelink or the second sidelink.

21. The method of claim 20, further comprising:
synchronizing timing on the first sidelink and the second sidelink.

22. The method of claim 20, wherein establishing the second sidelink with the second wireless communication device further comprises:
aggregating the second carrier frequency and at least a third carrier frequency within the second frequency band to form the second sidelink.

23. The method of claim 20, further comprising:
receiving reference signal configuration information from the second wireless communication device on the first sidelink, wherein the reference signal configuration information indicates a configuration of one or more reference signals to be transmitted on the second sidelink;
receiving the one or more reference signals on the second sidelink; and
transmitting a channel state information (CSI) report generated based on the one or more reference signals to the second wireless communication device on the first sidelink or the second sidelink.

24. The method of claim 18, wherein the SCI further comprises at least one of an identifier of the second frequency band on which the data is to be transmitted or resource information indicating the resources on which the data is to be transmitted.

25. The method of claim 24, wherein the resource information for the second sidelink is based on first sidelink parameters associated with the first sidelink, and further comprising:

translating the resource information based on the first sidelink parameters into translated resource information based on second sidelink parameters associated with the second sidelink.

26. The method of claim 25, wherein the first sidelink parameters comprise a first subcarrier spacing and a first bandwidth part associated with the first sidelink and the second sidelink parameters comprise a second subcarrier spacing and a second bandwidth part associated with the second sidelink.

27. A first wireless communication device, comprising:
a processor;
a wireless transceiver communicatively coupled to the processor; and
a memory communicatively coupled to the processor, wherein the processor and the memory are configured to:
establish a first sidelink with a second wireless communication device on a first frequency band comprising a first carrier frequency via the wireless transceiver
exchange synchronization reference information with the second wireless communication device to synchronize timing on the first sidelink and a second sidelink, wherein the exchanged synchronization reference information indicates any timing offset between respective slot boundaries of the first and second sidelinks and;
receive sidelink control information (SCI) on the first sidelink, the SCI comprising an indicator that the SCI is scheduling data to be transmitted by the second wireless communication device on resources for the second sidelink within a second frequency band comprising a second carrier frequency.

28. The first wireless communication device of claim 27, wherein the processor and the memory are further configured to:
establish, at least in part utilizing the first sidelink, the second sidelink with the second wireless communication device on the second frequency band via the wireless transceiver; and
receive the data on the second sidelink from the second wireless communication device via the wireless transceiver.

29. The first wireless communication device of claim 28, wherein the processor and the memory are further configured to:
transmit feedback information corresponding to the data to the second wireless communication device on the first sidelink or the second sidelink.

* * * * *